US012567518B2

(12) United States Patent
Oslislok et al.

(10) Patent No.: US 12,567,518 B2
(45) Date of Patent: Mar. 3, 2026

(54) COOLABLE SINGLE LINE AND CHARGING CABLE

(71) Applicant: BRUGG eConnect AG, Brugg (CH)

(72) Inventors: Tomasz Oslislok, Bad Zurzach (CH); Albert Martinez Vall, Baden (CH)

(73) Assignee: BRUGG eConnect AG, Brugg (CH)

( * ) Notice: Subject to any disclaimer, the term of this patent is extended or adjusted under 35 U.S.C. 154(b) by 720 days.

(21) Appl. No.: 17/911,801

(22) PCT Filed: Mar. 12, 2021

(86) PCT No.: PCT/EP2021/056399
§ 371 (c)(1),
(2) Date: Sep. 15, 2022

(87) PCT Pub. No.: WO2021/185703
PCT Pub. Date: Sep. 23, 2021

(65) Prior Publication Data
US 2023/0124670 A1 Apr. 20, 2023

(30) Foreign Application Priority Data

Mar. 16, 2020 (EP) ..................................... 20163431

(51) Int. Cl.
*H01B 7/42* (2006.01)
*B60L 53/16* (2019.01)
(Continued)

(52) U.S. Cl.
CPC .............. *H01B 7/423* (2013.01); *B60L 53/16* (2019.02); *B60L 53/18* (2019.02); *B60L 53/302* (2019.02); *H01B 7/0266* (2013.01); *H02J 7/0042* (2013.01)

(58) Field of Classification Search
CPC ........ B60L 53/302; B60L 53/16; B60L 53/18; H01B 7/423; H01B 7/0266; H02J 7/0042
(Continued)

(56) References Cited

U.S. PATENT DOCUMENTS

| | | | |
|---|---|---|---|
| 2,222,574 A | 11/1940 | Robertson | |
| 3,984,618 A | 10/1976 | Schmidt | |

(Continued)

FOREIGN PATENT DOCUMENTS

| | | |
|---|---|---|
| CA | 552769 A | 2/1958 |
| CN | 106849227 A | 6/2017 |

(Continued)

OTHER PUBLICATIONS

Office Action from the Saudi Arabia Patent Office dispatched Mar. 30, 2023 in related application No. 522440537, and machine translation thereof.

(Continued)

*Primary Examiner* — Suchin Parihar
(74) *Attorney, Agent, or Firm* — J-TEK LAW PLLC; Jeffrey D. Tekanic; Scott T. Wakeman

(57) ABSTRACT

A single line for a charging cable includes an open support structure (011, 012) having a longitudinal extent, at least one channel conductor (2) made of electrically conductive material, and an insulation (3). The at least one channel conductor (2) wraps around and contacts the open support structure (011, 012) along its longitudinal extension. The insulation (3) wraps the open support structure (011, 012) and the at least one channel conductor (2). At least one channel (4) for a cooling fluid (5) is provided and is formed by the support structure (011, 012) and the channel conductor (2). The insulation (3) is impermeable to the cooling fluid (5) and is electrically insulating.

20 Claims, 5 Drawing Sheets

(51) Int. Cl.

| | | |
|---|---|---|
| *B60L 53/18* | (2019.01) | |
| *B60L 53/302* | (2019.01) | |
| *H01B 7/02* | (2006.01) | |
| *H02J 7/00* | (2006.01) | |

(58) Field of Classification Search

USPC ........................................................ 320/109

See application file for complete search history.

(56) References Cited

U.S. PATENT DOCUMENTS

| | | | | |
|---|---|---|---|---|
| 8,280,467 | B2 * | 10/2012 | Yuan ...................... | H10N 60/00 |
| | | | | 505/220 |
| 8,938,278 | B2 * | 1/2015 | van der Laan ........ | H10N 60/35 |
| | | | | 505/231 |
| 9,734,940 | B1 * | 8/2017 | McNutt .................. | H01B 11/06 |
| 10,902,977 | B2 * | 1/2021 | Cantz ................... | H01R 13/506 |
| 2012/0199390 | A1 | 8/2012 | Oka et al. | |
| 2013/0166666 | A1 | 6/2013 | Emura | |
| 2015/0217654 | A1 | 8/2015 | Woo et al. | |
| 2017/0144558 | A1 | 5/2017 | Remisch | |
| 2019/0237218 | A1 | 8/2019 | Heyne et al. | |
| 2020/0303093 | A1 * | 9/2020 | Cantz ........................ | H01R 9/11 |
| 2020/0350098 | A1 * | 11/2020 | Neumann ............... | F16L 53/70 |
| 2021/0050127 | A1 * | 2/2021 | Lee ........................ | B60L 53/302 |
| 2021/0300193 | A1 * | 9/2021 | Friedrich ................. | H02G 3/03 |
| 2021/0407706 | A1 * | 12/2021 | Cantz .................... | B60L 53/302 |
| 2022/0029329 | A1 | 1/2022 | Kempf et al. | |
| 2022/0037056 | A1 | 2/2022 | Martinez Vall et al. | |
| 2023/0101820 | A1 * | 3/2023 | Radovinsky .............. | H01F 6/06 |
| | | | | 174/125.1 |

FOREIGN PATENT DOCUMENTS

| | | | |
|---|---|---|---|
| CN | 106887277 | A | 6/2017 |
| CN | 108701513 | A | 10/2018 |
| CN | 208014429 | U | 10/2018 |
| CN | 208189247 | U | 12/2018 |
| CN | 209822333 | U | 12/2019 |
| DE | 711922 | C | 10/1941 |
| DE | 102015120048 | A1 | 5/2017 |
| DE | 202015009531 | U1 | 2/2018 |
| EP | 2827344 | A1 | 1/2015 |
| EP | 3179485 | A1 | 6/2017 |
| EP | 3521100 | A1 | 8/2019 |
| EP | 3179485 | B1 | 10/2019 |
| EP | 3624141 | A1 | 3/2020 |
| EP | 3521100 | B1 | 12/2020 |
| IN | 106782835 | A | 5/2017 |
| JP | 2001126550 | A | 5/2001 |
| KR | 20110077232 | A | 7/2011 |
| WO | 2012029702 | A1 | 3/2012 |
| WO | 2017133893 | A1 | 8/2017 |
| WO | 2019135806 | A1 | 7/2019 |
| WO | 2020053104 | A1 | 3/2020 |
| WO | 2020114888 | A1 | 6/2020 |

OTHER PUBLICATIONS

English translation of the Written Opinion of the International Searching Authority for parent application No. PCT/EP2021/056399.

English translation the International Search Report dispatched Sep. 23, 2021 for parent application No. PCT/EP2021/056399.

Examination Report from the Australian Patent Office dispatched Sep. 20, 2024, in related AU application No. 2021237677.

Extended European Search Report from the European Patent Office dispatched Oct. 25, 2023, in related application No. EP 23188282.0, including European Search Opinion, and machine translation thereof.

Extended European Search Report from the European Patent Office dispatched Oct. 27, 2023, in related application No. EP 23188283.8, including European Search Opinion, and machine translation thereof.

Search Report from the Chilean Patent Office dated Jun. 4, 2024, in related Chilean application No. 202202537, including Search Report and Written Opinion, and machine translation.

Office Action and Search Report from the Chinese Patent Office dispatched Mar. 21, 2025, in counterpart application No. 202180036936.8, and translation thereof.

Office Action from the Israeli Patent Office dispatched Mar. 31, 2025, in counterpart application No. IL 296580, and translation thereof.

Office Action from the Korean Patent Office dispatched May 23, 2025, in counterpart application No. KR 10 2022 7035637, and translation thereof.

Written Opinion from the Indian Patent Office dispatched Nov. 6, 2025, in counterpart IN application No. 202217057870, and translation thereof.

* cited by examiner

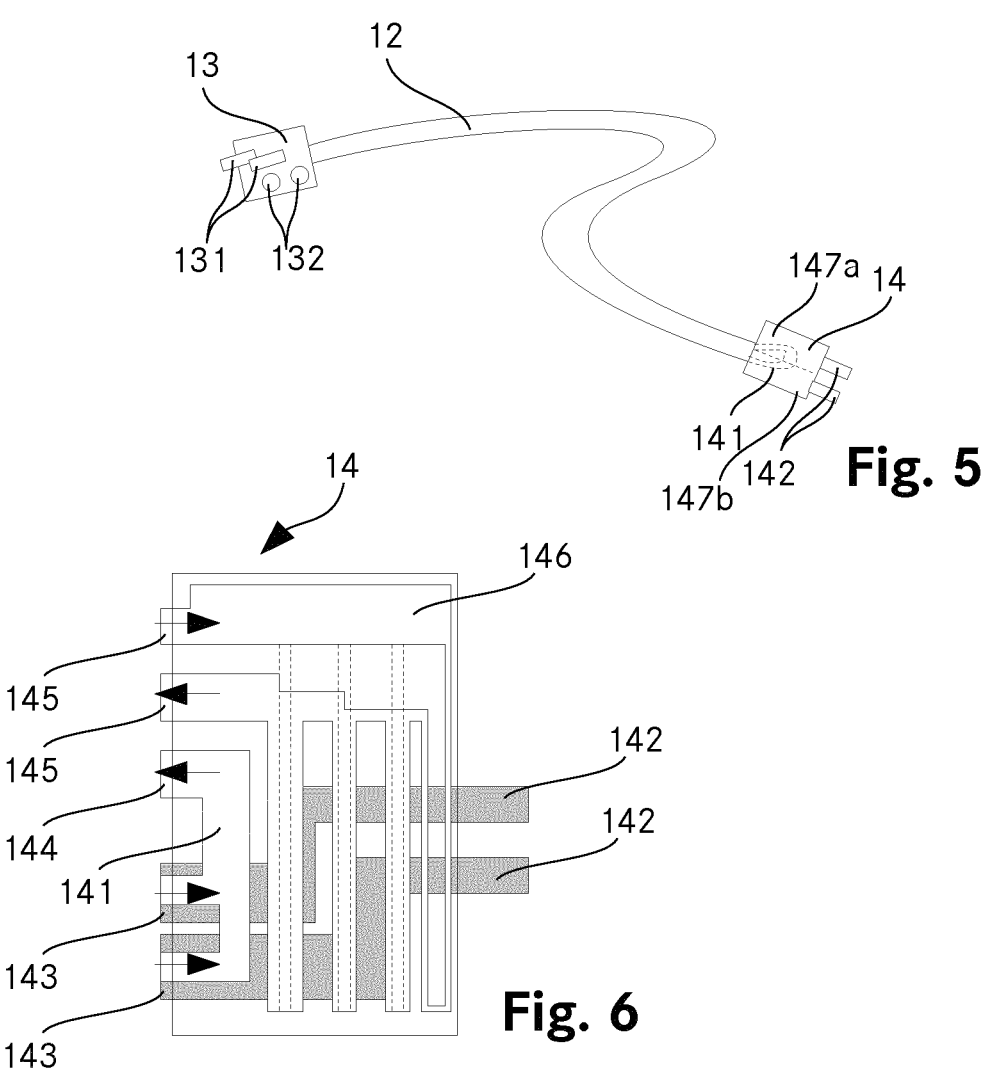
Fig. 5
Fig. 6
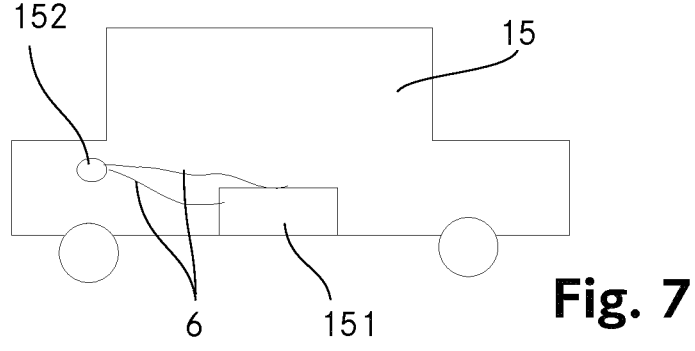
Fig. 7

COOLABLE SINGLE LINE AND CHARGING CABLE

CROSS-REFERENCE TO RELATED APPLICATIONS

This application is the US national stage of International Patent Application No. PCT/EP2021/056399 filed on Mar. 12, 2021, which claims priority to European patent application no. 20163431.8 filed on Mar. 16, 2020.

TECHNICAL FIELD

The invention relates to a single line for a charging cable, a charging cable containing two or more of such single lines, a charging system in which the charging cable is used, and a method for charging an energy storage device, in particular a drive battery of a vehicle, in which a charging cable according to the invention is used.

BACKGROUND ART

CN 1 06 782 835 A (Shenzhen Baoxing) describes a car charging cable. It comprises flexible hoses made of an electrically insulating material through which a cooling fluid can circulate. The hoses run inside the current-transmitting conductor arrangement.

A similar approach, i.e. the use of hoses or tubes inside the conductor assembly, is also proposed by US 2012/199390 A1 (Hitachi Cable) and CN 106 849 227A (Shenzhen Woer).

These arrangements have the disadvantage that the heat generated in the conductor arrangements must be conducted through the hose material before it can be removed by the cooling fluid. Cooling is delayed and less efficient.

On the other hand, CN 106 887 277 A (Jiangsu Shengbide Special) and DE 20 2015 009 531 U1 (Porsche) allow a cooling fluid to pass on the outside of the conductor arrangement, since the contact area there is larger and heat dissipation can thus be more efficient.

Such arrangements have the disadvantage that cooling can easily be interrupted if external pressure is applied to the cable. Particularly in the case of charging cables for vehicles, such as passenger cars, there is a risk of a person or a vehicle standing on the cable and squeezing the coolant channel. If the coolant channel is reinforced to prevent this problem, the cable must be correspondingly thicker and thus loses its manageability.

SUMMARY

The diameter of a charging cable should be such that a person can easily grasp it; i.e. it should have the smallest possible diameter, preferably less than 5 cm. It should be as flexible and light as possible in order to be easy to handle. In addition, it should not heat up so much that it becomes uncomfortable for the user to hold during a charging operation using the charging cable. Above a surface temperature of about 40° C., it becomes very uncomfortable to grip an object, such as a charging cable. Furthermore, the charging cable must be robust and able to withstand being run over by a car. In addition to all these requirements, the charging cable must be able to transmit high currents. The present standard charging currents used are up to 200 A. However, it is quite conceivable that even higher currents will be transmitted in the near future, in particular up to 700 A. It is therefore desirable to provide a cable that is adapted to be operated at the current to be transmitted.

It is therefore one non-limiting object of the present teachings to disclose techniques for enabling a single cable belonging to the above-mentioned technical field to be relatively light and flexible while still enabling large currents to be conducted therethrough without becoming uncomfortably hot. A cable in which such single lines are incorporated can also be made lighter and more flexible than a comparable cable with differently-configured single lines.

A single conductor for a charging cable according to the invention comprises an open support structure having a longitudinal extension, at least one channel conductor made of an electrically conductive material, and an insulation.

The at least one channel conductor wraps around and contacts the open support structure. The insulation wraps around the open support structure and the at least one channel conductor. At least one channel for a cooling fluid is provided. This channel is formed by the support structure and the channel conductor(s). The insulation is impermeable to the cooling fluid and is electrically insulating.

The single cable is designed in such a way that the heat generated in the channel conductor(s) owing to their ohmic resistance can be effectively dissipated. The single cable should be usable under weather conditions, i.e. in a temperature range of, for example, −50° C. to 50° C.

Since the cooling fluid can directly contact the channel conductor(s) through the open support structure, cooling is very efficient: on the one hand, the heat does not have to be conducted through a hose or any other type of separating layer, and on the other hand, in most cases a group of channel conductors has a larger surface area than the inside of a circular cylinder through which a hose can be approximated.

In addition, an internal cooling channel is better protected against squeezing than an external sheath.

Wrapping the support structure with the channel conductor(s) makes the resulting single line flexible: One or more channel conductors running parallel to the support structure offer less flow resistance to the cooling fluid and can thus be cooled even more efficiently, but when connected such conductor(s) act(s) like a tension and compression belt system and would thus stiffen a single line having parallel channel conductors.

Another advantage of winding is the ease of production: In essence, rope manufacturing equipment can be used, in which only the feed of the core strand or the core insert has to be adapted to the special design of the open support structure. Since the wrapping process allows the channel conductor(s) to be held in its (their) desired position relative to the support structure, an intermediate product of the single conductor can be temporarily stored on a reel until the insulation is applied. When applying the insulation, the separate and deliberate guidance of the channel conductor(s) and the support structure, which would be required for one or more conductors running parallel to the support structure, can be dispensed with.

The support structure ensures that the inner diameter always has a certain minimum value. It also increases the rollover resistance of the single conductor: Since compressive forces acting on the conductor are partially absorbed by the insulation and the conductor arrangement and are distributed somewhat spatially by the latter, the local load on the internal support structure is lower than for a support structure located outside the conductor arrangement. The support structure can be built as strong as necessary to withstand the desired forces.

In embodiments in which multiple conductors are utilized, the conductors present in the single line can be assigned to two groups: channel conductors and further conductors. The group of channel conductors and the further conductors, if present, are referred to below as the conductor arrangement.

Channel conductors are conductors which touch the support structure at least at one point or lie on the convex hull of the support structure and which delimit the channel for the cooling fluid. The ends of the support structure are thereby being disregarded. Preferably, all wires shall be associated with a channel conductor surrounded on all sides by channel conductors. Thus, the core wire of a stranded wire whose outer wires are channel conductors is also a channel conductor. In the case where all of the conductor wires of a structure, for example a stranded wire or a bundle, are attributed to the channel conductors, that structure is itself called a channel conductor. In the above example, the stranded wire is a channel conductor.

Further conductors are all conductors that extend along the longitudinal extent of the support structure, are in electrical contact with the channel conductors, but are not themselves associated with the channel conductors. Again, structures such as strands and bundles are referred to as "further conductors" if all the conductor wires belonging to them constitute "further conductors".

Where a structure, such as a stranded wire or bundle, consists in part of conductor wires associated with the channel conductors and in part of conductor wires associated with the further conductors, the structure is preferably associated with the channel conductors.

Wrapping or winding is a process in which the structure to be wrapped in essence retains its shape and the object with which the wrapping occurs is placed helically around the structure to be wrapped. In twisting, on the other hand, all the objects involved follow a helical shape whose longitudinal axis is offset with respect to the longitudinal axes of all the objects involved. In this sense, wrapping and twisting are stranding techniques.

A strand is, analogous to rope technology, a structure consisting of several wires twisted together. The pitch used for twisting is much smaller than for the bundles described below.

A bundle is intended to be understood as a structure of several wires running (extending) substantially parallel to each other. The wires of a bundle are also slightly twisted together, but only just to the extent necessary to avoid the need for wires of different lengths in the same bundle when wrapping the open support structure or the channel conductors. Unlike a stranded wire, whose wires are twisted before being used for wrapping, the twisting of the wires of the bundle occurs preferentially during wrapping.

The term "conductor cross-section" here and in the following refers to the total cross-sectional area occupied by conductors in the cross-section of the respective single line. Thus, for example, if a line or cable comprises three wires as conductors, each of which has a circular cross-section with a radius r, the conductor cross-section of this line or cable is $3\pi r^2$. If the cross-section of the conductor cannot be derived from such geometrical considerations, a test piece of the cable or wire of known length may be taken. Now separate the conductors from the other components of the cable and weigh them. If the density of the conductor material is known, the volume of the conductor can be determined. If the volume is divided by the known length of the test piece, a value for the conductor cross-section is obtained.

The convex envelope of a body is understood, in accordance with the present teachings, to be the smallest envelope which completely surrounds the body and in which any line connecting two points on the envelope lies within the enveloped volume or on the envelope.

An effective radius of a surface or object can be determined by dividing the perimeter of the surface or the cross-sectional area of the object by $2\pi$.

A helix in the mathematical sense is a curve that winds around the circumference of a circular cylinder at a constant pitch. The radius of the base of the circular cylinder is the radius of the helix. The pitch is the longitudinal distance required for the helix to wind one full revolution around the cylinder in the direction of the longitudinal axis of the cylinder. The gradient of the helix is the ratio of the pitch to the circumference of the base, that is, the pitch divided by $2\pi$ times the radius of the helix. The pitch angle is the arc tangent of the pitch. The thread direction of the helix indicates its winding direction: If it winds clockwise, it is right-handed.

For the purposes of this application, a helix is an object in which a material of substantially constant cross-section extends along the mathematical curve, for example a pin of metal or plastic having a circular or rectangular cross-section. Preferably, the pitch of the helix within the meaning of the application may vary, in which case it is particularly preferred that an effective pitch is used in the various embodiments and that this effective pitch is the extent of the helix along its longitudinal axis divided by the number of turns along that extent.

A "helical line" is to be understood here and in the following somewhat more generally as a helix and namely the curve is to wind itself with constant gradient around the mantle (outer surface) of a cylinder having an arbitrary base area. The base of this cylinder is also the base of the helix. The radius of the helix is the effective radius of the base. As was explained above, the pitch is the longitudinal distance required for one full revolution of the helix to wind around the cylinder in the direction of the long axis of the cylinder. The "gradient of the helix" is the ratio of the pitch to the circumference of the base. The pitch angle is the arc tangent of the pitch. The thread direction of the helix indicates its winding direction: If it winds clockwise, it is right-handed.

For the purposes of this application, a helix is an object in which a material of substantially constant cross-section extends along the mathematical curve, for example a pin made of metal or plastic with a circular or rectangular cross-section.

An open support structure is an elongated structure whose convex envelope has the shape of a cylinder, wherein at least one continuous channel, i.e. a channel which is not interrupted by the structure, runs along and inside the convex envelope. In this consideration, the support structure preferably is regarded as extending indefinitely in its longitudinal direction.

An example of an open support structure is a helix made of a round wire having a wire diameter d and a pitch h that is greater than the wire diameter d.

In this case the convex hull is a circular cylinder. The channel is also a helix and runs offset to the wire by half the pitch h, as well as additionally in the space surrounded by the helix. The width of the channel on the outside of the helix is equal to the pitch h minus the wire diameter d. This channel is not interrupted by the support structure. Thus, it is an open support structure in the sense of the invention.

Another example is an open profile, which is cross- or star-shaped in cross-section: the convex envelope in this case is a cylinder with a rectangle or a polygon as its base. The channels, there are several of them, run parallel to the longitudinal axis of the cylinder or the profile. Thus, this is also an open support structure in the sense of the invention.

A hose or a pipe, on the other hand, are not open support structures because the channel they form does not run along their convex hull but entirely within it.

If, on the other hand, the hose or tube has openings in its sidewall, the channel runs along the convex envelope at least in the region of these openings. It is then an open support structure.

Conductors, for the purposes of the present invention, are elongate and comprise electrically conductive material. Conductors may be, for example, wires or strips of metal. Preferably, conductors comprise a good conducting material, and may be coated. A good conducting material preferably has a resistivity of less than $10^{-5}$ $\Omega$m at 20° C. For example, a coating may be provided around the conductors to protect against corrosion. Preferably, the coating should also be conductive, but it may be less conductive than the good conductive material. Preferably, the coating is thinner than 100 µm. Conductors are in particular normal conductors.

In particular, the term "electrically insulating" in the sense of the present invention is a material having a resistivity of more than $10^5$ $\Omega$m, preferably of more than $10^{10}$ $\Omega$m. In particular, ethylene-propylene-diene monomer rubber (EPDM), ethylene-propylene rubbers (EPR) and/or thermoplastic elastomers (TPE) may be used as insulating materials.

A braid is a product that is created by regularly crossing and intersecting strands. Strands can be, for example, fibers or conductors, twisted or combined individually or in groups. The strands may cross at an angle of 90° or at any other angle. The braid may form a planar surface or mat, thus extending as far as desired in two dimensions, or may be in a cylinder-like shape extending as far as desired in only one dimension and restricted in the other two spatial dimensions. Preferably, the strands cross at an angle other than 90° and the braid forms a cylinder-like shape.

The term "directly enveloped" here and in the following means that no further (other) layers or structures are provided between the envelope and the enveloped. In this context, cavities and/or cooling fluid are not to be considered to be a layer or structure.

The term "enveloped" here and in the following means in particular that there may also be further layers or structures between the enveloped and the enveloping, but these do not necessarily have to be present.

In various embodiments, the ratios may quasi-irrational numbers. Quasi-irrational numbers are irrational numbers, as well as rational numbers which, when represented as a truncated decimal fraction, have a large numerator and a large denominator. A denominator or a numerator is preferably large if it is greater than or equal to 5, in particular greater than or equal to 10 or 100. In order to determine whether a ratio is quasi-irrational or not, the relevant part of the single line or of the charging cable may be examined for periodicity: a periodicity should preferably not occur in the case of a quasi-irrational ratio within the meaning of the present teachings, or the repeating length should be large, for example extending over more than 5, 10 or 100 times the larger of the two numbers in the ratio.

In an embodiment comprising multiple channel conductors, each of the channel conductors follows a helix having a thread direction, a pitch, and a radius. The thread direction and pitch of the helical lines of all of the channel conductors are substantially the same in this embodiment.

Preferably, in such an embodiment, the radii of all helical lines of all channel conductors are also the same.

This embodiment has the advantage of being particularly easy to manufacture. The channel conductors are all treated in the same way and wound around the open support structure. The support structure is thereby used in the stranding process analogous to a core strand or an insert. Thus, the equipment and processes known from stranding technology can be used to produce a single conductor of any length in a particularly simple and efficient manner. Production is particularly quick and easy.

If the radii of the helical lines of individual channel conductors are chosen to be slightly larger than the radii of the helical lines of further channel conductors, the permeability of the channel conductor layer, i.e. the number of all channel conductors in their arrangement in the single line, for the cooling fluid as well as the flexibility of the cable can be increased.

On the other hand, the preferred solution of selecting the same radii for the helical lines of all channel conductors is simpler and less expensive to manufacture and leads to better and more predictable durability of the single lines due to the resulting constant individual conductor structure.

Preferably, the channel conductors each follow a helix having a round base.

In another embodiment, however, the base of the helix is a polygon or a segment of a circle or an ellipse.

Each channel conductor has a cross-sectional area. In one embodiment of a single conduit, the cross-sectional areas of all channel conductors are the same.

If the cross-sectional areas of all channel conductors are the same, on the one hand, the production is easier, since for example the guides of the conductors can be designed in the same way during the stranding process, and, on the other hand, the resulting constant single conductor structure leads to a better and more predictable durability of the single conductor.

Preferably, for a given number of channel conductors, the pitch and the radius of the helical lines they follow are chosen such that adjacent channel conductors just touch.

Such an embodiment has the advantage that, on the one hand, it is particularly stable in manufacture and storage: the channel conductors fix each other in their position relative to each other. In addition, the current-carrying volume in the direct vicinity of the coolant channel is particularly large. If the coolant flows through the cable, the channel conductors are pressed away from the channel and gaps are created through which the coolant can escape from the channel.

Preferably, for a given number of channel conductors, the pitch and the radius of the helical lines they follow are chosen such that there is a distance between the channel conductors which is less than 0.5 times, preferably less than 0.25 times, more preferably less than 0.1 times the diameter of a channel conductor.

Such an embodiment has the advantage that, even at low cooling fluid pressure, the cooling fluid can reach the areas that are far from the duct and cool them efficiently. At the same time, at distances of less than 0.5 diameter of the channel conductor, there is still sufficient protection of the channel conductors against each other to prevent damage to the conductors due to slipping. With smaller distances, this safety and also the particularly well cooled conductor volume increase.

In one embodiment, each of the channel conductors is a single conductor wire. Preferably, each of the channel conductors is a conductor wire having a round cross-section.

For a given conductor cross-section, this results in comparatively few wires having large radii. Cavities having comparatively large volumes can thus be present next to and between the channel conductors, in which the cooling fluid can flow. Although the ratio of cooled surface area to volume is smaller than when using many conductor wires, the improved cooling fluid flow can result in sufficient or even better cooling than when using a large number of smaller wires. In addition, the comparatively massive channel conductors themselves act as further support structures and improve the rollover resistance of the single conductor. This embodiment is therefore particularly well suited if a cooling fluid having a higher viscosity is to be used or if there are particularly high requirements for rollover resistance.

In another embodiment, the channel conductors are strands or bundles of many individual, thin, conductor wires.

In a strand, the conductor wires are twisted together; in a bundle, the conductor wires run essentially parallel to each other.

Due to being composed of many thin wires, bundles and strands have a particularly high surface-to-volume ratio. In addition, strands are particularly flexible, as is known from ropes. This means that the use of strands as channel conductors makes it possible to produce particularly flexible single lines. Bundles, on the other hand, allow fluid to flow through them particularly well due to the essentially parallel wires and can therefore be cooled better inside than strands. Since bundles comprise many thin wires, they are also significantly more flexible than corresponding individual conductor wires. These embodiments are therefore particularly well suited if a cooling fluid having a lower viscosity is to be used or if a high flexibility of the single wire is of particular importance.

In a particular embodiment, the cross-sections of the channel conductors are oval, rectangular or have the shape of ring segments.

With these cross-sectional shapes, the ratio of surface area to volume is particularly large and at the same time the cross-sectional shapes are still sufficiently simple to exhibit the stability necessary for a single line of a charging cable. The use of such channel conductors can therefore improve cooling.

In a particular embodiment, all conductors are channel conductors. The insulation thus directly encases the channel comprising the open support structure and the channel conductors.

This embodiment has the advantage that all channel conductors come into direct contact with the cooling fluid from the channel. It is therefore of less importance whether and how much cooling fluid can enter between the channel conductors into the area between insulation and channel conductors. The latter is influenced, among other things, by the cooling fluid pressure in the single line. The embodiment is therefore particularly independent of the cooling fluid pressure.

In one embodiment of the single line, the channel comprising the open support structure and the channel conductors is surrounded by further conductors. The further conductors are in electrical contact with the channel conductors. The further conductors are either configured as one or more braids arranged coaxially around the channel or the further conductors are wires, bundles and/or strands wound around the channel or arranged parallel to the channel.

Preferably, the further conductors are wires, bundles and/or strands wound around the channel in such a way that the thread direction of the winding corresponds to the thread direction of the helical lines of the channel conductors and that the pitch of the helical lines of the further conductors differs from the pitch of the helical lines of the channel conductors. Particularly preferably, the larger of the two pitches is between 1.1 to 5 times, more preferably between 1.5 and 2 times larger than the smaller pitch, the ratio of the two pitches preferably being a quasi-irrational number.

The further conductors of this embodiment are remaining conductors.

It is also possible that there are some conductors arranged in braids, which are coaxial with the duct, and other conductors are either twisted between the braids around the duct or another braid, or twisted around all the braids.

In order to be able to transmit large currents, the single line should have a certain conductor cross-section. However, when arranging and selecting the channel conductor(s), the main requirement is always that a stable arrangement of the channel conductor(s) and the support structure relative to each other must be possible, such that the channel is preserved. Increasing the conductor cross-section by using thicker conductors is therefore only practicable within certain limits. The term "thicker conductor" means in particular a conductor whose effective radius is greater than 1.25 mm. It is easier to increase the conductor cross-section by arranging additional conductors around the channel conductors wrapped around the support structure.

These further conductors can be arranged as braids, which has the advantage that the channel conductors are held together towards the outside and are thus stabilised.

On the other hand, twisting conductors, strands or bundles around the channel conductors is quicker and cheaper to manufacture. Since the channel for the coolant is already formed and covered by the channel conductors and thus protected from further conductors slipping in, further conductors can be twisted onto the channel without affecting the channel itself.

The resistance of a conductor, and therefore the heat generated in it by a given current, is proportional to the cross-section of that conductor. A large conductor cross-section therefore reduces the heat generated. At the same time, however, conductor materials are dense and often not very flexible. For a charging cable, it is therefore advantageous to have a conductor cross-section that is as small as possible, but is of course still sufficient to meet the requirements with respect to heat generation. The same applies accordingly to the individual conductors of the charging cable.

In a preferred embodiment, the further conductors of the single line are arranged in such a way that they can also be penetrated (infiltrated) by the cooling fluid. For this purpose, the further conductors are arranged with small distances therebetween and some clearance to each other, so that small passages can form under the pressure of the cooling fluid, into which cooling fluid can penetrate. "Small distances" are in particular distances of less than 0.1 times the effective radius of the smaller of the two abutting conductors. This embodiment has the advantage that the surface area which can dissipate the heat generated in the conductors is very large. In addition, a comparatively homogeneous temperature distribution between all the conductors involved is achieved in a simple manner.

The wrapping of the channel conductors and the further conductors around the respective inner layer, i.e. either around the support structure or around the intermediate product of the support structure with the channel conductors, in the same thread direction leads to an advantageous torque distribution.

In a particular embodiment, the further conductors are wrapped with (in) a different thread direction than the channel conductors. This has the advantage that the intermediate product "support structure with conductor arrangement" is more stable and thus manufacturing is simplified.

The selection of a different pitch of the helical lines of the further conductors and the channel conductors prevents the further conductors from pressing into the gaps between the channel conductors. This increases the rollover resistance of the single conductor. In the case of different, but similar, pitch ratios, the wire lengths and the flexibility of the different conductor layers remain similar. The choice of a quasi-irrational pitch ratio has the advantage that no or hardly any repetitive structures are created along the longitudinal extension of the cables, which increases the service life of the single conductor.

In a particular embodiment, there are several layers of further conductors. The statements on the relationship between channel conductors and further conductors stated above can be transferred to this embodiment in that the respective inner layer of the further conductors assumes the role of the channel conductors and the respective outer layer of the further conductors assumes the role of the further conductors according to the previous embodiment.

Preferably, there are 2 to 3 layers of further conductors. This makes it easy to increase the conductor cross-section without significantly reducing the cooling efficiency.

In one embodiment, the support structure is a helix or an open profile. In particular, the open profile has a star shaped cross-section.

A helix is simple to manufacture, light, flexible and robust against pressure perpendicular to the longitudinal axis. The choice of the pitch determines how large the area through which the cooling fluid comes into contact with the conductor braid is, i.e. how efficient the cooling should be, and how robust the support structure against pressure should be. It is possible for a helix to have multiple pitches along its length. For example, a single line may have a helix with a smaller pitch in areas that are particularly in danger of being overdriven than in other areas. For ease of manufacture, the pitch is preferably constant along its entire length.

Preferably the gradient of the helix is between 0.1 and 0.3, more preferably the pitch is approximately equal to 0.2.

A support structure in the form of an open profile can also be easily manufactured, for example by extruding a suitable plastic material. While a helix has a comparatively large channel along its longitudinal axis, an open profile can be used to realize several, smaller channels or to force the cooling fluid to flow in a helical shape. With an open profile, it may be easier achieved that the cooling fluid mixes, and that not a part thereof flows quasi without contact to the conductor arrangement and without any heat absorption through the single line.

A star shaped cross-section is a shape that has a connecting surface and several ribs extending radially from it. The ribs are connected to each other only by the connecting surface. In a star shaped cross-section of the first order (of a first type), the connecting surface is a circle and the ribs all have the same length. Furthermore, the ribs are arranged at equal angular distances from each other. In this case, there are as many channels as there are ribs and all channels have the same cross-section.

In a star shaped cross-section of the second order (of a second type), the connecting surface can be of any cross-section and the ribs can have different lengths and be arranged at different angular distances from each other.

Again, there are as many channels as ribs, but their cross-section can be very different from each other.

The connecting surface and the ribs can have cavities. This saves weight.

In a particular embodiment, the support structure is a helix, the thread direction of which is different from the thread direction of the channel conductor(s).

In a particular embodiment, the support structure is a helix and the pitch of the helix of one of the channel conductors is greater than the pitch of the support structure.

In a particular embodiment, the support structure is a helix and the pitch ratio, which is the smallest pitch of the helix of one of the channel conductors divided by the pitch of the helix of the support structure, is greater than 4/3, preferably greater than 2 and most preferably a quasi-irrational number greater than 4 and in particular greater than 6.

In a particular embodiment, the pitch ratio is less than 50.

In a particular embodiment, the support structure is a helix and the pitch of the helix of one of the channel conductors is greater than the pitch of the helix of the support structure and the thread direction of the helix of the support structure is different from the thread direction of the helix of the channel conductors.

In a particular embodiment, the support structure is a helix and the pitch ratio, which is the smallest pitch of the helix of one of the channel conductors divided by the pitch of the helix of the support structure, is greater than 4/3, preferably greater than 2 and most preferably a quasi irrational number greater than 4 and the thread direction of the helix of the support structure is different from the thread direction of the helix of the channel conductors.

All of these embodiments result in a particularly stable channel that holds up even when the single line is used in a charging cable. Charging cables are moved by users, bent in all directions and often rolled over by vehicles. All this can lead to relative movements between the support structure and the channel conductors. If these relative movements are too large for the selected single duct configuration, individual channel conductors can slip inside the channel. This event is referred to as "collapse" of the channel. The absence of the collapsed channel conductor at the original location gives the surrounding channel conductors more freedom of movement, allowing more channel conductors to slip into the interior of the channel, thereby causing looping and subsequent conductor breakage and similar problems. Broken conductors and a channel blocked by a channel conductor that has slipped in increase the electrical and flow resistance of the single line. Both lead to an increase in temperature during use. A failure of the charging system in which the affected cable is used is the consequence.

Therefore, the single line should be designed in such a way that, on the one hand, the channel conductors are sufficiently loosely wound around the supporting structure to allow the cooling fluid to penetrate into the spaces between the insulation and the conductor arrangement such as to ensure efficient cooling and, on the other hand, the movement of the channel conductors does not cause the channel to collapse under any circumstances.

One possibility for such a construction is to swap (interchange) the thread direction of the support structure and the channel conductors: In this case, there are always points where the helix of the channel conductors is above (over) the helix of the support structure. Collapse over the entire length is thus excluded.

Another possibility is to choose the pitch of the helix of the support structure to be smaller, preferably significantly smaller than the pitch of the helix of the channel conductors:

If, for example, the pitch of the helix of the channel conductors is 4/3 of the pitch of the helix of the support structure, there are 3 turns of a channel conductor and every 4 turns of the helix of the support structure a point at which a channel conductor fully rests on the support structure. This can be sufficient for small pitches and stable channel conductors.

However, the system becomes much more stable with a pitch ratio of 2 or more: Now the channel conductor rests on the support structure at least once per revolution. With a pitch ratio of 4 or more, the channel conductor rests on the support structure at least once every half revolution, which ensures "break-in protection" in the event of displacement to either side. As the pitch ratio increases, the angle at which the channel conductor and support structure cross at the point of support increases: If the pitch ratio is greater than about 6, crossing angles of more than 450 can be achieved: "slipping" of the channel conductor from the support structure thus becomes even less likely.

Particularly preferably, the pitch ratio is a quasi-irrational number: Thus, the points at which the channel conductor rests on the support structure always move to different angles along the longitudinal extent of the cable. Thus, there is no direction in which a displacement of the channel conductor relative to the support structure would lead to a significant increase in the risk of a line collapse.

More preferably, the pitch ratio is a quasi-irrational number greater than 6. For example, the pitch ratio may be √(37) or 6.1 or √(44) or 6.63, √(48) or 6.93, since these numbers are not only quasi-irrational but also still have some distance to the rational numbers with a denominator less than or equal to 7.

If one combines the different thread direction with a pitch ratio of more than 1, in particular of more than 4/3, preferably of more than 2 and most preferably with a quasi-irrational number greater than 4 and in particular greater than 6, one achieves a particularly stable and at the same time very easy to manufacture channel.

Preferably, the pitch ratio is less than 50: a very high pitch of the helixes of the channel conductors significantly limits the flexibility of the single cable. Further, a very small pitch of the helix of the support structure limits the flexibility, reduces the flow of the cooling fluid into the area of the cable between the line and the insulation, increases the weight of the single line, and is therefore undesirable in many cases.

With the embodiment having a pitch ratio between 4 and 50, which is particularly preferably a quasi-irrational number, very good collapse resistance can be ensured with a high degree of flexibility.

In one embodiment, the support structure is an open profile whose cross-section remains constant in shape and size along its longitudinal extent, but this shape twists about a longitudinal axis along the longitudinal extent.

Such a profile is also referred to as a twisted profile in the following. The twisting creates helix-shaped channels. A cooling fluid flowing through these channels is thus given a twist. Near the longitudinal axis, the path is shorter than on the outside. Therefore, there are different speeds in the fluid within the channel and as a result there is more mixing of the cooling fluid. The entire volume of the cooling fluid can thus be better utilized.

In one embodiment, the convex envelope of the support structure has a cross-section with a shape that remains substantially the same along the longitudinal extent of the support structure. In this embodiment, the points of contact of the support structure with its convex envelope form support structure lines. The angle at which at least some of the channel conductors cross at least some support structure lines is between 45° and 135°, preferably between 60° and 120°.

The support structure lines represent the areas where the channel conductors rest on the support structure.

A collapse of the channels formed with the help of the support structure can occur in particular if a channel conductor runs almost parallel to its contact surface on the support structure.

A collapse of the channels is to be feared in particular if all channel conductors intersect the contact surfaces of the support structure at a flat angle. Therefore, it is preferred if at least some of the channel conductors intersect the support surfaces, i.e. the support structure lines at an angle of more than 45°. This makes it unlikely that the channels will collapse, even when moving and under external pressure.

Particularly preferably, all of the channel conductors cross at least some support structure lines at an angle between 45° and 135°, and more preferably at an angle between 60° and 120°.

In this embodiment, it is virtually impossible for any channel conductor to break into one of the channels. The single line becomes even more robust.

The angle at which the channel conductors and the support structure cross, i.e. the crossing angle, depends on both the pitch ratio and the ratio of the radius of the helix of the support structure to the pitch of the helix of the support structure, in the case where the support structure is a helix and the channel conductors follow a helical line of circular cross-section. For example, a crossing angle of more than 45° can be achieved with a pitch ratio of √37 or 6.1 and a radius of the helix of 0.4 times the pitch of the helix of the support structure.

For example, a crossing angle greater than 60° can be achieved with a pitch ratio of about 15, for example of √226 or 15.05, and a radius of the helix of 0.6 times the pitch of the helix of the supporting structure.

In one embodiment, the support structure is a helix made of metal. The metal may in particular be steel. In particular, the steel is a chromium-nickel steel.

Most metals can be formed into a helix and conduct electricity, and thus on the one hand can take over the supporting function of the supporting structure and on the other hand can conduct part of the current.

A steel wire is comparatively easy to shape into the desired form. A helix made of steel is flexible and dimensionally stable. Furthermore, this support structure is comparatively insensitive to heat, so that a single line can be constructed which will not be damaged if the coolant fails, or only after a longer period of time. Chromium-nickel steel is rustproof and has proved to be particularly suitable in trials, as this support structure can be easily processed and can be used with a wide range of possible cooling fluids and channel conductor materials.

Copper conducts electricity well. A helix made of copper can therefore conduct part of the current itself. This saves some material, which makes the cable lighter. Besides copper, copper alloys are also suitable.

Aluminum also conducts electricity well and can be formed into a helix.

In one embodiment, the conductors of the single line, in particular the channel conductors, are made of copper. Preferably, the channel conductors are made of uncoated or tinned copper wires.

Copper is a good and common conductor, both of electricity and heat, and is comparatively ductile. Silver has even better conductivity, but is less economical. Aluminium is also a good conductor, but less so than copper. On the other hand, aluminium is less dense than copper. So with aluminium conductors the cable would be lighter.

The term copper is preferably intended to mean copper materials having a minimum content of 99.5%, particularly preferably 99.9%, by weight of Cu.

Tin coating has the advantage that the wires are protected against corrosion. However, tin coating or another type of coating can also be dispensed with, depending on the choice of cooling fluid. This is particularly the case if the cooling fluid is provided with additives which form a corrosion protection. Untinned and otherwise uncoated wires are less expensive than tinned wires.

So when using uncoated wires, the cooling fluid does at least two jobs: It protects the wires that make up the conductor(s) from corrosion and it cools the conductor(s).

In one embodiment, the insulation is a fibre-reinforced insulation.

The insulation should, on the one hand, keep the cooling fluid inside the single line and, on the other hand, electrically insulate the conductor(s) from the environment. At the same time, the flexibility of the single line should be restricted as little as possible by the insulation. The insulation therefore usually consists of a flexible plastic, for example EPDM, EPR or TPE.

While the flexibility of the plastic does not limit flexibility of the single cable as a whole, it also causes the cable sheath to expand under the pressure of the cooling fluid during operation. A certain expansion of, for example, no more than 10% of the outer radius in the absence of cooling fluid is quite advantageous, as this creates openings in which the cooling fluid can flow.

If the insulation expands more than desired, however, this can lead to damage to the insulation, on the one hand, and cause the pressure in the single line to drop sharply and unintentionally, on the other hand. In order to limit the expansion to a desired extent, a fibre-reinforced insulation is therefore preferably used, in which fibres are arranged in or around the plastic.

In one embodiment, the fibre-reinforced insulation comprises fibres having a high E-modulus and a good temperature resistance embedded in an electrically insulating plastic material.

The electrically insulating plastic material comprises, in particular, ethylene-propylene-diene mono rubbers (EPDM), ethylene-propylene rubbers (EPR) and/or thermoplastic elastomers (TPE).

The E-modulus of the fibres at 20° C. is preferably higher than 50 GPa. The fibres are preferably temperature resistant to above 100° C. Particularly preferred are aramid fibres, especially poly(p-phenylene terephthalamide) fibres, hemp fibres or polyethylene fibres.

In a particular embodiment, the fibre-reinforced insulation comprises aramid fibres in ethylene propylene rubber (EPR) or hemp fibres in ethylene propylene rubber (EPR).

Unlike conventional electrical cables, the insulation of the single line is also exposed to a, possibly high, internal pressure from the cooling fluid. The fibre reinforcement absorbs part of this internal pressure and thus increases the reliability of the insulation.

Fibres having a high E-modulus and a good temperature resistance are particularly suitable for controlling the expansion of the single line, even if the single line heats up more than intended due to special circumstances. In one embodiment, the fibres lie on the outside of the insulation. There they can be protected from abrasion by, for example, a varnish or a protective sheath. Preferably, however, the fibres are embedded in the insulation. In this way, they are protected against environmental influences and abrasion without there being a material transition and the associated durability difficulties.

The two combinations "aramid fibres in EPR" and "hemp fibres in EPR" have proven to be particularly suitable and durable.

In one embodiment, the fibres of the fibre-reinforced insulation are interwoven to form a braid.

Fibre reinforcement of the insulation can also be achieved by randomly interspersing fibres or wrapping fibres or yarns around the insulation. However, the use of a braid has the advantage that a homogeneous and twist-free support of the insulation can be produced in a simple way, which allows expansion up to a certain degree and then effectively prevents further expansion of the insulation.

In one embodiment, the fibres are located on the outside of the insulation. In this embodiment, the insulation and the fibres thereon are encased in an electrically insulating single line sheath.

Preferably, the single line sheath and the insulation are substantially similar in composition, although the sheath may be differently coloured. The similar choice of material prevents stresses at the interface between the insulation and the single conductor sheath, since both react in the same way to temperature changes and mechanical loads. The different choice of colour allows damage to the single line sheath to be clearly identified.

The material of the single line sheath can also be different from the insulation and, for example, be specially equipped for resistance to special environmental conditions.

In one embodiment of a fibre reinforced insulation of a single conductor, the fibres are arranged substantially in a layer. In this layer they cover between 30 and 90%, preferably between 50 and 70%, more preferably about 60% of the area of the layer.

If the fibres cover too small a proportion of the area of the layer in which they are arranged, there is a risk that they will cut into the sheath. If the fibres cover the area too densely, the flexibility of the single conductor can decrease.

In one embodiment, the ratio of the free volume of the single line to the volume of the conductors is greater than 0.25, preferably greater than 1, more preferably greater than 1.5.

Preferably, the ratio of the volume of the single line to the volume of the conductors is less than 3, and in particular less than 2.

The free volume of the single line represents in particular the volume inside the insulation which is not occupied by conductors, in particular by the channel conductors, nor by the support structure and through which the cooling fluid can therefore flow during operation.

It has been found that effective cooling of the conductors can be achieved in particular when the volume ratio is greater than 0.25. If the volume ratio increases, this means that more cooling fluid can flow through the individual conductors without great pressure. A larger volume ratio therefore allows good cooling even if the cooling fluid can only be introduced with limited pressure. At the same time, a large amount of cooling fluid, as is the case with a large volume ratio in operation, makes the single line heavy, thick and unwieldy, so that the preferred upper limit is a ratio of 3 and preferably 2.

A charging cable according to the invention comprises a first and a second single line according to the invention and a common protective sheath.

The common protective sheath holds the two single lines together and protects them from abrasion and environmental influences such as UV radiation, fuel residues, shards and the like. The protective sheath may be multi-layered, containing individual layers of different coloration, so that critical abrasion can be easily detected. The protective sheath may be interspersed with thin test leads which can be used to detect excessive heat and/or damage to the cable, for example by an increase in electrical resistance in these test leads. The protective sheath may be reinforced in places or as a whole, or may be provided with structures or coatings to improve grip. The protective sheath may also be thermally insulating, for example to prevent freezing of the cooling fluid, especially when water is used, at low outside temperatures, and in particular also to dissipate the end heat during use primarily via the cooling fluid and to prevent excessive heating of the outside of the protective sheath.

In one embodiment, the common protective sheath encases the single lines only in sections, for example at regular intervals and/or where particular stresses are feared. Preferably, the common protective sheath envelops the first and the second single line substantially over their entire length.

Preferably, the first and second single lines have the same structure and differ, if at all, only in the colouring of their insulation. In another embodiment, the first and second single lines differ in their support structure, in the design of the conductor arrangement and/or in their dimensions.

In one embodiment, a charging cable further comprises an earth (ground) conductor braid surrounding the first and second single lines and encased by or integrated with the common protective sheath.

The earth conductor braid is a braid of electrically conductive wires.

This earth conductor braid can serve as a neutral and/or shield, depending on the charging cable's mode of operation. It can also be used to detect damage to the cable or overheating.

If the earth conductor braid is integrated into the protective sheath, material of the protective sheath is located below (under) and above (over) the earth conductor braid. Thus, the earth conductor braid is protected and can be used to detect damage to the cable or high sheath temperature.

If, on the other hand, the earth conductor braid lies within the cavity defined by the protective sheath but outside the protective sheath itself, it is more flexible.

The earth conductor braid may also be attached to the inside of the protective sheath.

Alternatively or additionally, the charging cable comprises a ground (earth) conductor in the form of juxtaposed wires or strands or bundles integrated into the common protective sheath and wrapping the two single lines together. Preferably, such an earth (ground) conductor comprises a plurality of groups of such juxtaposed wires, strands or bundles separated from each other by sections of protective sheath material, which does not comprise any wires or strands or bundles.

This embodiment has the advantage that the earth conductor, in addition to its conductor function, which is similar to that of the earth conductor braid described above, also contributes to the mechanical stability of the charging cable:

Preferably, the two single lines and other components, referred to here as the inner workings, of the charging cable are twisted together before the protective sheath is applied: this results in a round and flexible charging cable. Without opposite twisting, the charging cable could untwist under tensile load. An earth conductor in the form of wires or strands arranged side by side can wrap the inner cable together in the opposite direction of the twisting of the inner cable. The earth conductor thus represents the winding of the charging cable.

In one embodiment of a charging cable, the latter comprises an earth conductor which consists of twisted wires, is twisted together with the two single lines and which is sheathed by the common protective sheath. Preferably, this ground conductor further comprises an electrically insulating ground conductor insulation.

Preferably, the charging cable comprises both a first ground conductor twisted together with the two single lines and a second ground conductor surrounding the two single lines and the first ground conductor together.

The second earth conductor may be an earth conductor braid surrounding the first and second single lines and the first earth conductor and enveloped by or integrated into the common protective sheath and/or an earth conductor in the form of juxtaposed wires or strands integrated into the common protective sheath and wrapping the two single lines and the first earth conductor together.

Such a first earth conductor can be a common power cable. A charging cable that integrates the ground (earth) conductor in this way is particularly easy to manufacture and inexpensive.

Preferably, the first earth conductor is located outside the single lines. Preferably, the ground conductor is located outside a hose.

The first earth conductor is part of the inner workings of the charging cable.

In one embodiment, the charging cable further comprises signal cables. Preferably, signal cables are grouped together in groups whose members are in close spatial proximity to each other and preferably touch each other. Particularly preferably, the groups comprise exactly three signal cables each.

In one embodiment, a charging cable comprises one or more signal cables, preferably arranged in a common sheath. The signal cables are arranged, preferably in the common sheath, within the common protective sheath. Each signal cable comprises a signal conductor and a protective layer. The protective layer encases the signal conductor.

In at least one of the signal cables, the signal conductor comprises conductors in the form of wires. The conductor cross-section of the signal conductor is less than $\frac{1}{20}$, preferably less than $\frac{1}{40}$, of the conductor cross-sections of the first single line. The protective layer is electrically insulating.

Typically, there are several signal cables. By combining them in a common sheath, the construction and connection of the charging cable is simplified, as all signal cables are spatially close together. In addition to signal conductors made of conductors, signal conductors made of optical fibres may be used.

Signal conductors made of conductors should transmit much less power than the single lines. Therefore, their conductor cross-section is much smaller.

The signal cables of each group are preferably first twisted together before the groups of signal cables are twisted together with the two single lines and further components of the inner workings of the charging cable and then, particularly preferably, are sheathed by a second earth conductor and the common protective sheath.

In one embodiment, a charging cable comprises at least one hose, preferably two, three or four hoses, made of a fluid-tight material. The hoses are located within the common protective sheath but outside the first or second single line.

The hoses are used to transport cooling fluid outside the single lines. The hoses are part of the inner workings of the cable. In a preferred embodiment, the charging cable comprises exactly two hoses having the same inner and outer diameter.

Suitable materials for hoses include polypropylene, polyurethane (PUR), EPDM, nylon, polyamides and silicones. The material should be suitable for the cooling fluid used, be flexible and be able to withstand high internal pressure. The hoses can be fibre reinforced.

In a first embodiment, the cooling fluid is pumped through the single lines and exits at the end of the cable and is disposed of. This procedure is suitable, for example, with air as the cooling fluid.

In another embodiment, the cooling fluid is transported to the first single line and back through the second single line.

In a further embodiment, the cooling fluid is transported through both single lines and back through one or two hoses.

In another embodiment, the cable further comprises two hoses which are the forward and return lines to a plug cooling system.

In another embodiment, the cable comprises two hoses, one of which is the supply line to a plug cooling system and the other of which is the return line for cooling fluid from the plug cooling system and from the two single lines.

In this context, the term "supply line" means a conduit or hose leading away from a pump or high fluid pressure location. The term "return line" means here and in the following a duct or hose leading to a pump or a location with low fluid pressure. Preferably, the assignment of what belongs to the supply line and what belongs to the return line changes halfway along the path of the cooling fluid from the outlet of the pump back to its inlet, or halfway along the path from the location of high fluid pressure to the location of lower fluid pressure. The high fluid pressure here is a pressure that is higher than the low fluid pressure.

The hoses can have different diameters. The diameter of the hoses is selected depending on the space available and the desired speed of the fluid at the desired flow rate.

The hose or hoses can have a round or a non-round cross-section. Hoses having a round cross-section are easier to manufacture and are available in a wide variety. Hoses having a non-round cross-section, on the other hand, can make optimum use of the space available in the charging cable.

In one embodiment, the single lines are in a hose. In this embodiment, the common protective sheath may constitute the hose.

A hose, in the sense of the present disclosure, is intended to transport cooling fluid. Its ends are therefore connectable in particular in a fluid-tight manner and it is made of a fluid-tight material. Preferably, the interior of the hose is free, apart from the cooling fluid in operation.

In one embodiment, a charging cable includes one or more of the following: earth (ground) wire, signal cable, hose, shunt.

Each of these components has a substantially circular cross-section and this cross-section has a circumferential radius.

The first and second single lines each have a circular cross-section and the cross-sections of the first and second single lines have the same circumferential radius R.

The circumferential radius of each of the components is less than or equal to the circumferential radius R of the first single line and preferably less than or equal to $\frac{2}{3}$ of the circumferential radius R of the first single line.

The components are part of the inner workings of the charging cable.

In a preferred embodiment, the circumferential radius of each of the hose and the shunt is substantially equal to $\frac{1}{3}$ or $\frac{2}{3}$ of the circumferential radius R of the first single line. In particular, there are no more than two components having a circumferential radius of $\frac{2}{3}$ of the circumferential radius R of the first single line and no more than four components having a circumferential radius of $\frac{1}{3}$ of the circumferential radius R of the first single line in a charging cable of this embodiment.

According to this embodiment, the single lines determine the circumference of the charging cable and the present charging cable has a round cross-section. All other components share the space that results within the circumference around the two single lines. This embodiment has the advantage that the comparatively stable single lines support the entire cable against pressure loads in at least one direction. Due to the optimal use of space, the circumference of the cable is as small as possible, which improves its grippability.

The shunt consists of twisted or parallel fibres or strips and has the function of keeping the cable in shape and is essentially a filler. However, the shunt can also be used to absorb mechanical tensile forces on the cable. It thus serves, among other things, to provide rollover resistance. In particular, the shunt is made of a low-cost thermoplastic material that is free of halogens. Examples of such materials are polypropylene and polyethylene.

Preferably, all components of the inner workings are twisted together.

A connection system comprises a single line and two connection parts. Each of the two connection parts includes a fluid connection and an electrical connection.

The fluid connection allows a fluid to flow into and out of the single line. The electrical connection provides a path for the transfer of electrical energy between a tap point and the conductors of the single line.

Preferably, each of the connection parts is formed as a chamber. The chamber has a first opening for fluid-tight connection of the single line. The chamber has a second opening for connecting a fluid line. This is the fluid connection. Inside the chamber is an electrical contact for making an electrical connection to the conductors of the single line. This electrical contact inside the chamber is connected to a power line leading to the tap point. This is the electrical connection.

The connection system allows the single line according to the invention to be used in a cooling fluid circuit as well as in an electrical circuit.

A charging system comprises a first connection system and a second connection system. The first connection system comprises the first single line of the charging cable and the second connection system comprises the second single line of the charging cable. A first end of the first single line and a first end of the second single line are located at the first end of the charging cable. A second end of the first single line and a second end of the second single line are located at the second end of the charging cable. The end connector includes the connection part at the first end of the first single line and the connection part at the first end of the second single line. The plug includes the connection part at the second end of the first single line and the connection part at the second end of the second single line.

The charging system allows the charging cable according to the invention to be used in a circuit in which the single lines used are cooled.

In one embodiment of the charging system, the fluid connections of the two connection parts arranged in the plug are connected to each other such that fluid can flow from one fluid connection into the other.

The plug thus establishes a fluid connection between the two single lines. While the fluid circuit is thus closed at the plug, the electrical circuit continues to the consumer or to an energy storage device.

In operation of this embodiment, cooling fluid flows through a single line to the plug and through the other single line back to the connector.

In one embodiment of the charging system, each of the fluid connections of the connection parts which are comprised in the plug are connected to a respective hose of a charging cable.

The plug thus establishes a fluid connection between a single line and a hose. While the fluid circuit is thus closed at the plug, the electrical circuit continues to the consumer or to an energy storage device.

In operation of this embodiment, cooling fluid flows through a single line to the plug and through a hose back to the connector or vice versa.

In one embodiment of the charging system, at least the fluid connection of one of the two connection parts, preferably the fluid connection of both connection part forming the end connector, is connected to a fluid line to an external fluid source.

In this way, a single line of the charging system can be supplied with cooling fluid.

Preferably, both fluid connections are connected to the fluid source and hoses carry the cooling fluid from the plug back to the fluid source. In this embodiment, during operation, the cooling fluid is cooled in the fluid source and pressurized and fed back into the single lines via the fluid connections.

The charging system comprises a charging cable having at least two hoses for supplying a plug cooling and a plug with a plug cooling. The plug comprises two hose connections. The plug cooling comprises at least one cooling line connecting the two hose connections. Thus, cooling fluid can be introduced into the plug cooling line via one of the at least two hoses and this cooling fluid can flow out again through another of the at least two hoses.

Great heat is generated primarily where the electrical resistance is high. This is often the case on contact surfaces and at connection points, i.e. precisely in the area of the plug. However, parts of the plug should remain touchable for the user and thus have a surface temperature of less than 40° C. Other parts, in particular the connection points of the conductors, can fail due to excessively high temperatures. To prevent this, the use of a connector cooling system is a good solution. This can either use the cooling fluid of the single lines or have its own cooling fluid supply lines. The use of the cooling fluid of the single lines in the plug cooling allows a compact design of the cable, since no additional hoses are required. However, if the primary purpose of the plug cooling is to lower the surface temperature so that the user can touch the plug, supplying the plug cooling through two hoses is more efficient: The same set point is preferred for the surface temperature of the charging cable and the plug. The flow rate of the cooling fluid can now be selected just to reach this set point at the end of the cable. Generally, however, such a heated cooling fluid cannot also be used to lower the plug to the setpoint. Instead, the cables, in the variant without hoses to supply the plug cooling, would have to be cooled more than desired to keep the plug at the setpoint temperature. This greater cooling means a higher flow rate and thus higher fluid velocities and/or a larger free volume in the single lines. Higher fluid velocities and thus higher pressures make the charging cable less flexible; large free volumes make the charging cable less manageable and heavy. Ultimately, for a target current, a desired highest surface temperature, a length of cable and a given connector design, it can be calculated whether cooling the connector via the cooling fluid of the single lines or via supply hoses results in the more compact charging cable with sufficient flexibility in the specific case.

A method according to the invention for charging an energy storage device, in particular a battery of a vehicle, at a stationary charging station which can provide cooling fluid and electrical energy and to which a first end of a charging cable according to the invention is connected, comprises the following steps:

Connecting a second end of the charging cable to the energy storage device, in particular to the battery of the vehicle.

Introduction of a cooling fluid under pressure, in particular pumping of the cooling fluid, into the channels of the single lines of the charging cable.

Transmission of electrical energy via the channel conductors and, if applicable, the further conductors of the single lines of the charging cable.

Thereby, signal cables of the charging cable are preferably used for transmitting signals for controlling and/or monitoring the charging process and/or the state of charge of the energy storage device, in particular the battery.

In one embodiment, the method further comprises cooling the cooling fluid before it is introduced into the channels of the single lines of the charging cable.

By using cooled cooling fluid, even higher currents can be transmitted with (via) the charging cable and the charging process becomes independent of the temperature at which the cooling fluid is provided.

The energy storage device of the vehicle is in particular a battery for powering the vehicle. Preferably, connecting the charging cable to the battery of the vehicle is done by a plug mounted on the charging cable and a socket mounted on the vehicle and connected to the battery. The plug can be inserted into the socket to connect.

Preferably, the pressurized cooling fluid is introduced by a pump mounted locally on or in the charging station. However, it is also possible that the charging station is connected to a tank or pipe that provides cooling fluid at a certain pressure. For example, it is conceivable that the cooling fluid is supplied by water and a water tower, whereby the water is pumped into a reservoir at a higher level, separated in time and space from the charging station and the charging process, and is then taken from the pipe at the desired pressure and fed directly into the single lines.

The signal cables can establish communication between the vehicle and the charging station. For example, the charging station can interrupt the flow of current in the event of error messages or check the correct connection of the charging cable to the vehicle's battery before charging begins. However, the signal cables can also be used to monitor the charging cable itself by conducting sensor signals from sensors in the plug or from sensors in the cable to the charging station. For example, if a sensor detects a temperature above a certain threshold, the charging station can increase the flow of cooling fluid or interrupt the charging process.

A method according to the present disclosure for manufacturing a single line comprises the following steps, which are preferably carried out successively in a production line:

a) Providing an open support structure and multiple channel conductors as continuous material.

b) Winding the channel conductors onto the support structure.

c) Preferably, winding further conductors around the structure created in step b).

d) Co-extruding the insulation around the result of step b) or c).

e) Preferably, weaving a braid of fibres or winding fibres around the insulation produced in step d).

f) Preferably co-extruding a second layer of insulation material around the product of step e) to form a fibre reinforced insulation.

The co-extrusion of the insulation onto the wound channel conductors and the optional further conductors according to step d) is preferably done with a hose tool.

The use of a hose tool has the advantage that the material of the insulation is not pressed against and between the external conductors, i.e. the channel conductors or the further conductors, depending on the design. This means that the cooling fluid can also surround and cool the external conductors on all sides during operation.

The co-extrusion of the second layer of material of the insulation according to step f) preferably occurs in such a way that the first layer of insulation produced in step d) adheres and bonds to the second layer produced in step f), and the fibres are thereby surrounded as completely and tightly as possible by the material of the insulation. A pressure tool is therefore preferably used for this co-extrusion step.

Preferably, if fibre-reinforced insulation is produced, a first layer of material of the insulation is applied in step d), the fibre reinforcement is applied in one layer in step e), and the second layer of material of the insulation is applied in step f), such that the fibre-reinforced insulation comprises two layers of material of the insulation and the layer of fibres therebetween.

Such a process is particularly easy to carry out. With such a method, single lines according to the invention can be produced conveniently and fully automatically as a continuous product. Time-consuming and error-prone steps, such as braiding conductors, are eliminated.

The method of manufacturing a charging cable according to the invention comprises the following steps, which are preferably carried out successively in a production line:

a) Providing two single lines according to the invention and, if necessary, further components of the inner structure of the desired charging cable as endless products.

(b) twisting the components of the inner structure together in a first direction.

c) Preferably wrapping the twisted components of the inner structure with wires, bundles or strands in a second direction different from the first direction.

d) Co-extrusion of a protective sheath.

Such a process is particularly easy to carry out. With such a method, charging cables according to the invention can be produced conveniently and fully automatically as a continuous product.

Since the protective sheath of the charging cable may fill the interstices of the interior of the charging cable and, for the purpose of improving the stability of the cable, is also intended to fill the interstices of the interior of the charging cable in many embodiments, the co-extrusion of the protective sheath according to step d) is preferably carried out using a compression tool.

A vehicle according to the invention comprises single lines according to the invention, which preferably establish an electrical connection between a drive energy storage device and a drive unit and/or an electrical connection between a socket on the outside of a vehicle and a drive energy storage device.

A charging station according to the invention comprises single lines according to the invention, which connect a plug of a charging cable to a stationary power source.

In a particularly preferred embodiment, the plug and the socket on the outside of the vehicle are designed in such a way that the conductor arrangement of the single line that is part of the vehicle is electrically connected to the conductor arrangement of the single line that is part of the stationary charging station and cooling fluid can flow from the single line that is part of the vehicle into the single line that is part of the stationary charging station and vice versa. The socket comprises two connection parts which are connected to two single lines of the vehicle.

In one embodiment, the tapping points of the connecting parts belonging to the plug and to the socket are each hollow-cylindrical in shape and each form the fluid connection of the respective connecting part. The outer diameter of a tapping point of the plug corresponds substantially to the inner diameter of a tapping point of the socket or vice versa, so that in each case a tapping point of the plug and a tapping point of the socket can be pushed into one another at least over a certain distance, thereby forming an electrically conductive connection. Preferably, the tapping point having the smaller outer diameter includes, at its end facing the single line, a region having a larger outer diameter, which forms a stop. A cooling fluid seal can be provided at this stop.

In one embodiment of the charging system, the fluid connections of the two connection parts forming the plug are connected to each other in such a way that fluid can flow from one fluid connection into the other. In each case, one of the connection parts belonging to the socket comes into electrical contact with the tapping point of one of the connection parts belonging to the plug when the plug is inserted in the socket. The fluid connections of the connecting parts belonging to the socket are in fluid-tight contact with fluid passage channels of the plug in the plugged-in state, whereby two hoses of the charging cable form a continuation of the fluid passage channels in the plug and thus ensure a supply of the cooling fluid to the single lines of the vehicle during charging.

In a preferred embodiment, there is a set of two single lines and two connecting parts, wherein the two single lines can be detachably and reconnectably connected to each other via the two connecting parts. In this case, one single line is connected to a first type of connector part and the other single line is connected to a second type of connector part.

Ambient air, water, oil, especially transformer oil, or ester fluid can be used as cooling fluid. Water preferably comprises additives for corrosion protection, to lower the freezing point and/or to increase the heat capacity.

A preferred cooling fluid is a mixture of distilled water with propylene glycol and, particularly preferably, other additives for corrosion protection. In one embodiment, an additive is also added to lower the conductivity of the mixture. This mixture has a high heat capacity and a low viscosity.

Water has the advantage of having a high heat capacity, being non-toxic and readily available. Additives can be used to lower its freezing point and influence other properties. For example, the water can also be provided with corrosion protection or its heat capacity can be increased by additives.

Transformer oil and ester liquids, such as saturated pentaerythritol tetra fatty acid esters, are known from transformer applications where they are also used to cool electronic components.

Ambient air has the advantage that it is always available and no storage is required.

In addition to the cooling fluid, the cooling capacity can also be influenced by a flow rate.

A charging cable according to a preferred embodiment comprises a first and a second fluid-coolable single line and a common protective sheath. Further, the charging cable comprises two hoses made of a fluid-tight material which can conduct cooling fluid in the same amount as the two single lines. The charging cable of this embodiment further comprises signal cables, preferably 12 signal cables which are in the form of four groups of three signal cables each. Further, the charging cable comprises an earth (ground) conductor. The earth conductor is formed as a conductor having its own insulation and is arranged within the common protective sheath. Finally, the charging cable comprises a shunt made of synthetic fibres or hemp fibres. The single wires, tubing, signal cables, earth conductor and shunt are twisted together in a first direction and form the inner structure of the charging cable of this embodiment. Juxtaposed individual wires or thin strands are wound around this inner structure in a second direction, different from the first direction, and are surrounded by the protective sheath. Several groups of the juxtaposed individual wires or thin strands are separated from each other by sections of protective sheath material which do not contain any conductors.

In a preferred embodiment, the charging cable comprises two fluid coolable single lines whose support structure is a chromium steel helix. The channel conductors are bundles of uncoated copper wires and there are no further conductors. Each of the single lines is surrounded by fibre-reinforced insulation. This charging cable also includes two hoses, a first round cross-section earth conductor surrounded by its own insulation, and four groups of signal cables, each comprising three signal cables surrounded by a common signal cable sheath. The two single lines, the first earth conductor, the two hoses and the four groups of signal cables are located within a common protective sheath.

The protective sheath includes four groups of conductors arranged side by side, separated by sections of sheath material without embedded conductors. The conductors within the protective sheath also act as earth conductors. This preferred embodiment of a charging cable represents a particularly good compromise in terms of overdriving resistance, flexibility, weight and safety.

From the following detailed description and the totality of the claims, further advantageous embodiments and combinations of features of the invention will be apparent.

BRIEF DESCRIPTION OF THE DRAWINGS

The drawings used to explain the embodiment show:

FIG. 5 a charging system;

FIG. 6 a plug with plug cooling;

FIG. 7 a vehicle with two single lines.

In principle, the same parts are given the same reference signs in the figures.

DETAILED DESCRIPTION OF THE INVENTION

Figure 1A:
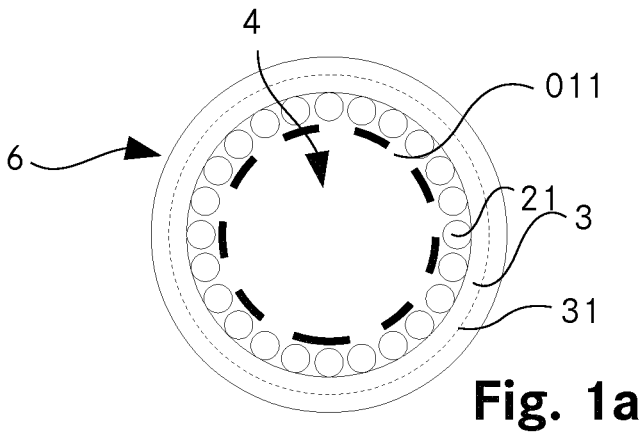
FIG. 1a a round single line with a helix as a support structure, which is wrapped with channel conductors.

FIG. 1a shows a cross-section of a circular single line 6 with a helix 011 as a support structure and channel conductors 21 following helical lines having a circular base, which wrap around and contact the helix 011. The channel conductors 21 conduct current flowing through the single line 6. The channel conductors 21 are directly wrapped by an insulation 3. The insulation is fibre reinforced. It comprises an inner layer of insulating material and an outer layer of insulating material and an intermediate layer in which there is a fibre fabric surrounded by insulating material as fibre reinforcement 31. Inside the helix 011 is the free volume of the channel 4 formed by the helix 011 and the channel conductors 21. However, this channel 4 is not cooling fluid-tight, so that the cooling fluid 5 can spread in the radial direction towards the insulation 3.

Figure 1B:
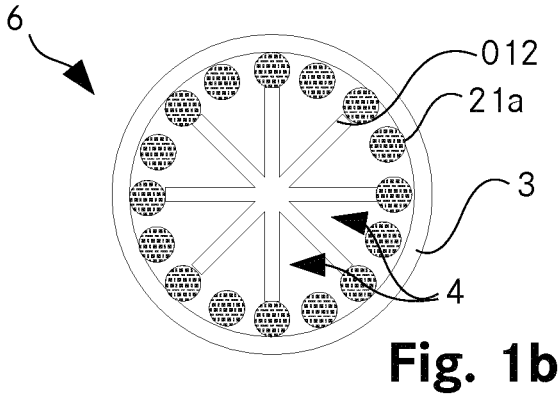
FIG. 1b a round single line with an open profile as a support structure, which is wrapped with channel conductors in the form of bundles.

FIG. 1b shows a cross-section of a circular single line 6 with an open profile 012 as a support structure and channel conductors 21a, which are wire bundles. The channel conductors 21a conduct the current flowing through the single line 6. The channel conductors 21a follow helical lines having a round base. The helical lines followed by the channel conductors 21a all have the same radius, the same thread direction and the same pitch. The channel conductors 21a are directly wrapped by an insulation 3. In cross-section, the support structure has the shape of a star with a circular connecting surface and six ribs arranged uniformly around the connecting surface. It is therefore a star cross-section of the first order (of a first type). There are a total of six channels 4 of equal size formed by the open profile 012 and the channel conductors 21a, in which case also the structure of the channel conductors 21a and thus the channel 4 is intended to be permeable to the cooling fluid 5. The cooling fluid 5 can thus spread as far as the insulation 3.

Figure 1C:
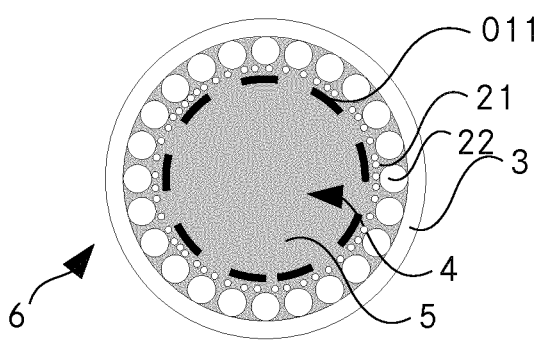
FIG. 1c a round single line with a helix as a support structure and a second layer of further conductors on the channel conductors.

FIG. 1c shows the distribution of the cooling fluid 5 in another single line 6. A cross-section through a circular single line 6 is shown with a helix 011 as a supporting structure and channel conductors 21 following helical lines having a circular base, which wrap around and touch the helix 011. The channel conductors 21 are surrounded by further conductors 22. The further conductors 22 are in electrical contact with the channel conductors 21, but do not themselves contact the support structure. Here, the diameters of the channel conductors 21 are significantly smaller than the diameters of the further conductors 22. The channel conductors 21 and the further conductors 22 jointly conduct the current flowing through the single line 6. The further conductors 22 are directly wrapped by an insulation 3. Inside the helix 011 is the free volume of the channel 4 formed by the helix 011 and the channel conductors 21. However, this channel 4 is not cooling fluid-tight, so that the cooling fluid 5 can spread in a radial direction around the further conductors 22 and up to the insulation 3.

The cooling fluid 5 is shown in grey. The insulation 3 is fluid-tight. The conductors 21, 22 themselves are generally impermeable to fluid, but the fluid is distributed in the spaces between them. Eventually it reaches the distribution shown, where substantially all conductors 21, 22 are in contact with the fluid over most of their surface area.

Figures 2A, 2B, 2C:
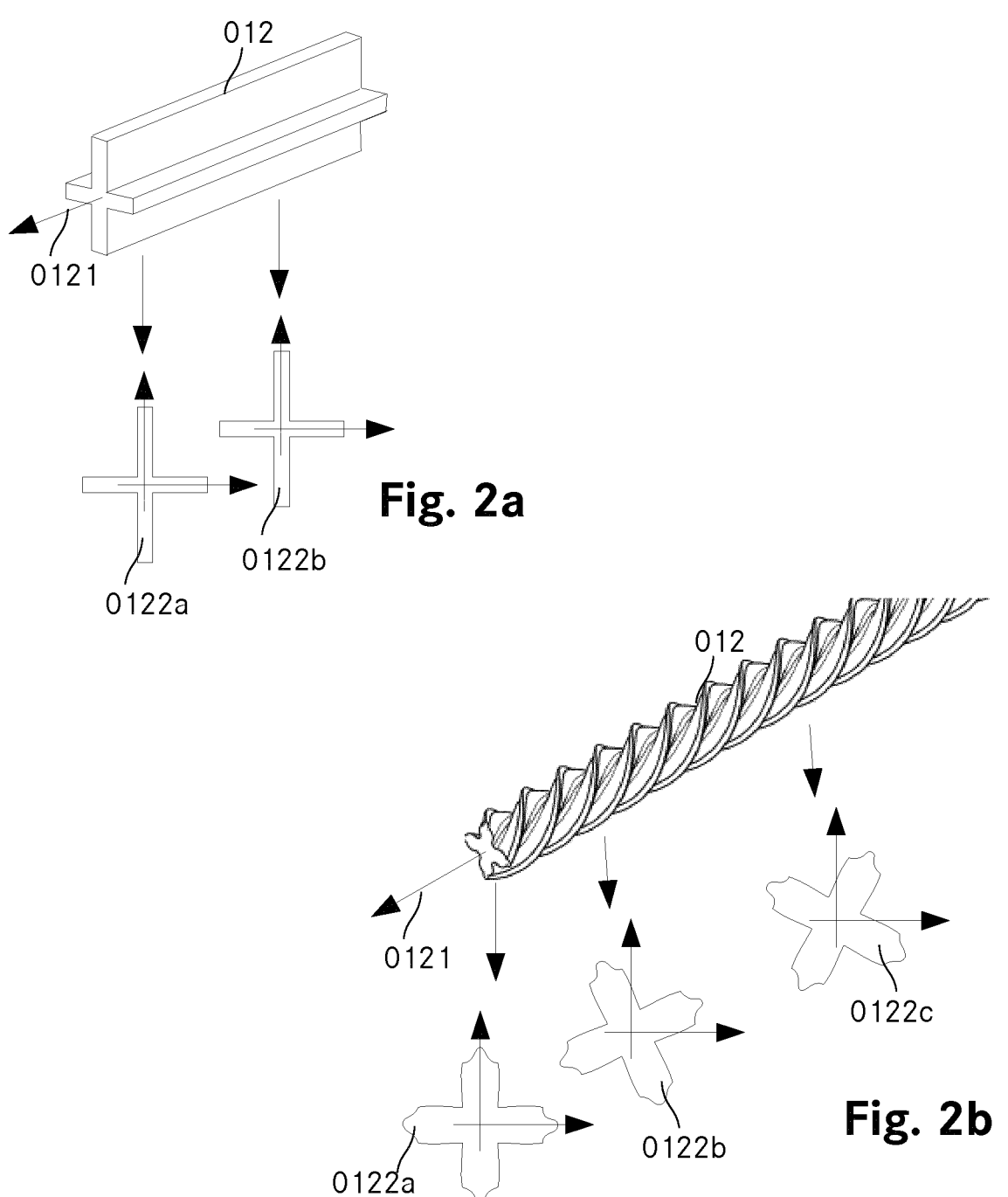
FIG. 2a an open profile.
FIG. 2b a twisted open profile.
FIG. 2c a helix having a variable pitch.

FIG. 2a shows an open profile 012 having a star cross-section of the second order (of a second type) with a round connecting surface and four ribs distributed at uniform angular intervals but having different lengths. The open profile 012 has a longitudinal axis 0121. Cross-sections along this longitudinal axis 0122a, b, c are always the same and have the shape of an upright cross, the horizontal extension always being smaller than the vertical extension.

FIG. 2b shows an open profile 012 having a star cross-section of the first order (type) with a round connecting surface and four ribs distributed at equal angular intervals and having equal lengths. The open profile 012 has a longitudinal axis 0121 and cross-sections along this longitudinal axis 0122a, b, c are always the same in shape but are twisted with respect to each other. The shape of the cross-sections is a cross with approximately triangular ribs, the height of the triangles being equal. This is an example of a twisted open profile.

FIG. 2c shows a helix 011 having sections (longitudinal segments) of different pitch 0111. This helix 011 is made of round wire. The helix 011 also has a longitudinal axis 0121.

Figures 3A, 3B, 4A, 4B:
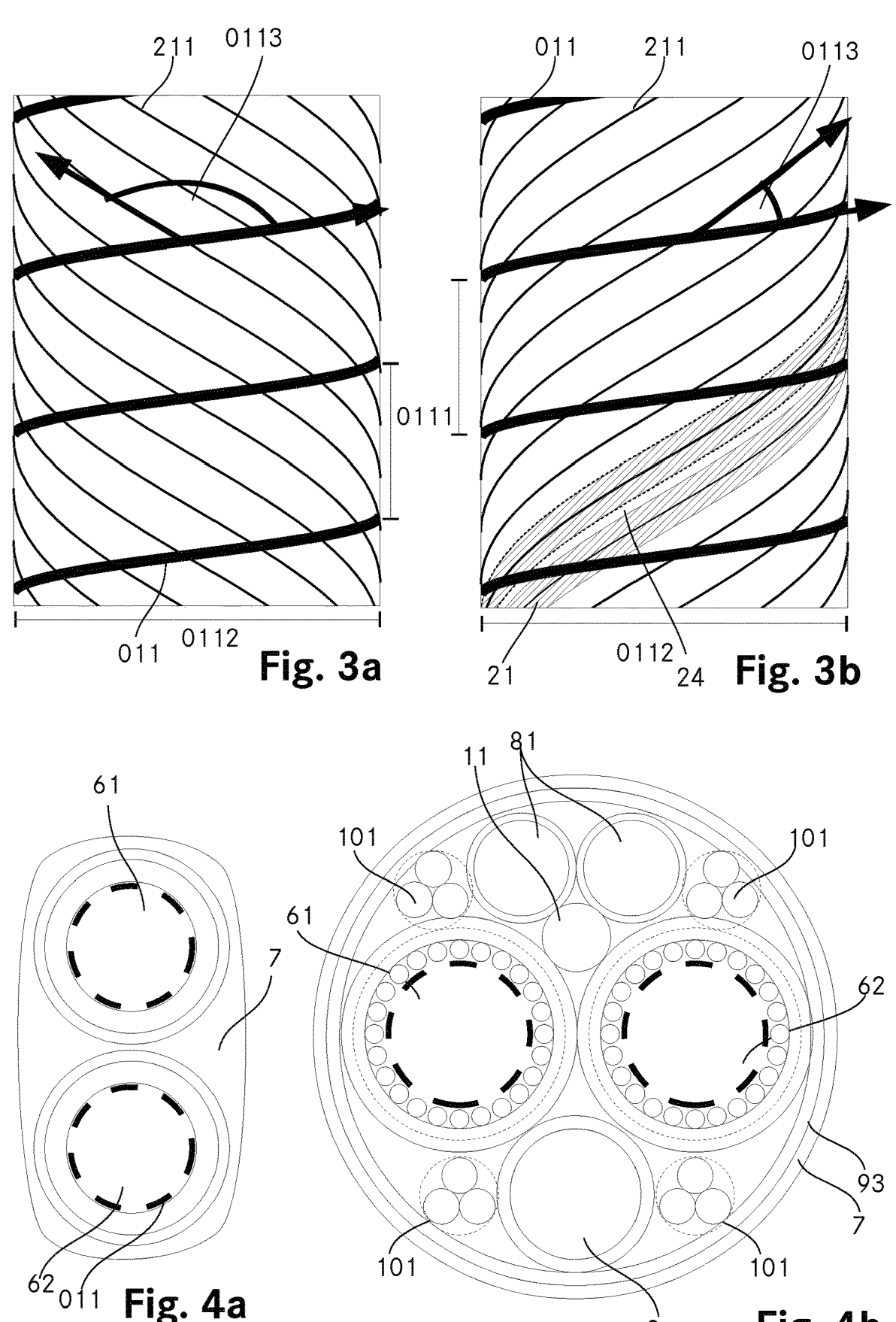
FIG. 3a a helix as a support structure wrapped with channel conductors, the support structure and the channel conductors differing in their thread direction.
FIG. 3b a helix as a support structure wrapped with channel conductors, the support structure and the channel conductors having the same thread direction.
FIG. 4a a charging cable with two single lines.
FIG. 4b a first embodiment of a charging cable with two single lines, earth (ground) conductor, hoses and signal cables.

FIG. 3a shows a helix 011 having a constant pitch 0111 in side view. The pitch 0111 can be easily identified in this view, for example by looking at the distance between two points where the helix 011 appears in the field of view. Here, the pitch 0111 is a unit length. Also, in this view, the diameter 0112 of the cylinder defined by the helix 011 is equal to the width of the rectangle as which the cylinder appears in this view. Here, the radius of the base of the cylinder is equal to 1.15 units of length.

The convex envelope of the helix 011 is the cylinder shown in the side view. The points of contact of the supporting structure, i.e. the helix 011, with this circular cylinder, i.e. its convex envelope, are precisely the points of the helix 011 furthest from the longitudinal axis 0121 of the helix 011. Therefore, the lines of the supporting structure in the present case (since the extension of the wire defining the helix 011 is not shown) precisely resemble the lines with which the helix 011 is drawn in FIG. 3a.

The helical lines 211 of the channel conductors each have a pitch of about 4.5 units of length and are left-handed. The pitch angle is arctan(pitch/(π diameter))=arctan(4.5/(2 1.15 π))=32°.

Helix 011 of the support structure is right-handed and has a pitch 0111 of 1 and thus a pitch angle of arctan(1/(2.3*π))= 8°.

Thus, in the example shown, the helical lines 211 of the channel conductors cross the support structure lines at an angle 0113 of (180°−32°)−8°=140°.

The pitch ratio is 4.5.

FIG. 3a shows the course of a support structure in the form of a helix 011 and the helical lines 211 having a round base which the channel conductors follow in one embodiment. The helix 011 and the helical lines 211 have a different pitch. While helical lines 211 all have the same pitch, the same thread direction, and the same radius, helix 011 of the support structure has substantially the same radius but a significantly lower (smaller) pitch. In the example shown, a channel conductor 21 that follows one of the helical lines 211 shown rests on (abuts) the helix 011 of the support structure a total of six times during one revolution about the longitudinal axis of the support structure.

FIG. 3b shows a very similar embodiment to FIG. 3a. However, the helix 011 of the support structure and the helical lines 211 of the channel conductors now have the same pitch. While the helical lines 211 all have the same pitch, the same clearance and the same radius, the helix 011 of the support structure has substantially the same radius but a much smaller pitch. In the example shown, a channel conductor 21 that follows one of the helical lines 211 shown will rest on (abut) the helix 011 of the support structure only a total of four times during one revolution about the longitudinal axis of the support structure.

In the example shown, the helical lines 211 of the channel conductors now cross the support structure lines 011 at an angle 0113 of 32°−8°=24°, because of the same thread direction.

The pitch ratio is also 4.5 here.

In FIG. 3b, in addition to the helical lines 211 of the channel conductors, two channel conductors 21 in the form of strands are also shown. To allow the cooling fluid to exit the channel, there is a small gap 24 between the channel conductors 21. Although it may appear different in FIG. 3b, the channel conductors 21 rest on (abut) the outside of the support structure and wrap around it.

FIG. 4a shows a charging cable 12 with two single lines 61 and 62. The first and second single lines 61 and 62 have a helix 011 as a support structure and both have a round cross-section and the same diameter. The single lines 61 and 62 are only shown schematically. Whether there is only the channel conductor 21 or also further conductors 22 is left open here. All variations are possible and the first single line 61 could be constructed differently than the second single line 62. Also, the single lines 61 and 62 could differ in diameter and/or shape. The two single lines 61 and 62 are adjacent to each other and within a common protective sheath 7. Here, the protective sheath 7 has the cross-section of a rectangle with rounded corners and somewhat bulged sides. In this case, the protective sheath 7 fills the entire space between its surface and the single lines 61 and 62.

FIG. 4b shows another charging cable 12 comprising two single lines 61, 62. The two single lines 61 and 62 have the same diameter and are arranged side by side, thus defining the inner diameter of the protective sheath 7 surrounding the single lines 61, 62. The single lines 61 and 62 shown correspond to the single line shown in FIG. 1a. Inside the protective sheath 7, i.e. in the area between its inner and outer radii, there is an extended earth (ground) conductor 93 in the form of a plurality of copper wires running (extending in) parallel and winding around the cable interior.

This extended earth conductor 93 may also be implemented by (as) a conductor braid. The extended earth conductor 93 can serve both as a neutral conductor and as a screen or sensor for defects or excessive temperatures in the protective sheath 7. Inside the protective sheath 7 there is also an earth (ground) conductor 9 which consists of twisted copper wires and is provided with its own insulation completely inside the inner radius of the protective sheath 7. Furthermore, inside the protective sheath 7 there are two hoses 81 as well as a shunt 11 made of synthetic fibres, as well as four groups of three signal cables 101 each.

Figures 4C, 4D:
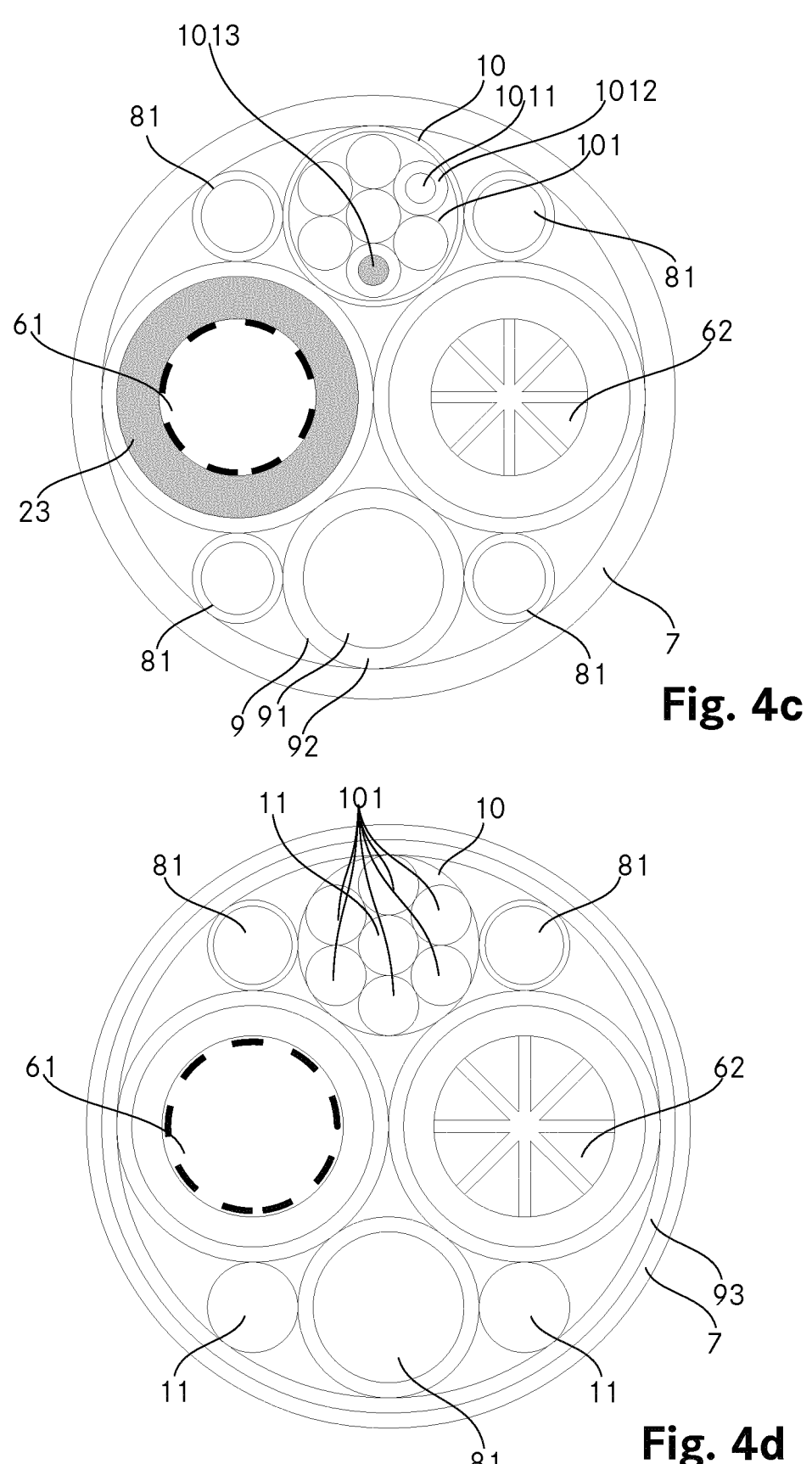
FIG. 4c a second embodiment of a charging cable with two single lines, earth (ground) conductor, hoses and signal cables.
FIG. 4d a charging cable with two single lines, hoses, shunt, signal cables and an (ground) earth conductor braid.

FIG. 4c shows another charging cable 12 comprising a first and a second single line 61, 62, an earth conductor 9, seven signal cables 101 in a common sheath 10 and four hoses 81. All this is surrounded by a common protective sheath 7. The protective sheath 7 is in the form of a circular hollow cylinder having an internal diameter equal to twice the diameter of a single line. The first and second single lines 61, 62 both have a circular cross-section and the same diameter. They differ in support structure: the first single line 61 uses a helix 011, while the second single line 62 uses an open profile 012.

The earth conductor 9 also has a round cross-section. It consists of neutral conductor wires 91 and neutral conductor insulation 92. The diameter of the earth conductor 9 is ⅔ of the diameter of the first single line 61.

The sheath 10 of the sheathed signal cables 101 also has a diameter of approximately ⅔ of the first single line 61. In cross-section, the sheath 10 of the sheathed signal cables 101 is circular. Each of the signal cables 101 also has a circular cross-section. The sheath 10 is thin. Two of the illustrated signal cables 101 comprise a signal conductor 1011 which is directly surrounded by a protective layer 1012. The signal conductor 1011 has a signal conductor cross-section 1013.

The conductor cross-section 23 of the first single line 61 is also shown. It includes both the conductor cross-section of the channel conductors 21 of the single line 61 and the conductor cross-section of possible further conductors 22 in electrical contact with the channel conductors 21.

The conductor cross-section 23 of the first single line 61 is more than 20 times the signal conductor cross-section 1013.

Each of the four hoses 81 has a circular cross-section and an outside diameter of about ⅓ the diameter of the first single line 61.

The first and second single lines 61, 62 are arranged adjacent to each other and in contact. Above the point of contact and in contact with both single lines 61, 62 is arranged the sheath 10 with the signal cables 101 sheathed therein. Below the point of contact and in contact with both single lines 61, 62 is arranged the earth conductor 9. The two hoses 81 returning the cooling fluid 5 of the single lines 61, 62 are each arranged to be in contact with one of the single lines 61 or 62 and the earth conductor 9. The two hoses 81 supplying the plug cooling system 146 are each arranged to be in contact with one of the single lines 61 or 62 and the sheath 10. This results in a tight packing of all the components of the charging cable 12 and the two single lines 61, 62. Moreover, in this arrangement there are as many as eight points lying on the circumference of the arrangement. The inside of the protective sheath 7 corresponds exactly to the circumference of the arrangement. Four of the eight points are exactly 90° apart and are formed by solid conductors, the single lines 61, 62, the earth conductor 9 and the signal cables 101 in their sheath 10. The potentially compressible hoses 81 lie between these barely compressible structures. Under strong pressure, the hoses 81 may well be somewhat deformed, but the barely compressible structures on both sides protect them from complete closure.

In a preferred embodiment, the support structure of both single lines 61, 62 is a helix 011 made of a wire composed of chromium-nickel steel having a wire diameter of 0.6 mm. This is surrounded by 14 channel conductors 21 composed of uncoated copper wires each having a cross-sectional area of 2.5 mm², resulting in a conductor cross-section 23 of the single line 61 of 35 mm². An insulation, preferably made of TPE or EPDM, surrounds the channel conductors 21 and completes the single line 61. The insulation is reinforced by an aramid or hemp fibre braid. The single line 62 is of the same construction. In the charging cable 12, in addition to two such single lines 61, 62, there are six signal cables 101 each having a conductor cross-section 1013 of 0.75 mm², which are arranged around a shunt 11 and are held together by a common sheath 10. The cable also comprises two hoses 81, each having an internal diameter of 4 mm, an earth (ground) conductor 9 having a conductor cross-section of 16 mm², and two strands of shunt 11. The arrangement is preferably as described in FIG. 4c, although the hoses 81 for supplying the plug cooling 146 have been replaced by the shunt 11.

FIG. 4d shows another charging cable 12 comprising first and second single lines 61, 62, three hoses 81, three strands of shunt 11, six signal cables 101, an extended earth (ground) conductor 93 in the form of a braid and a protective sheath 7. The six signal cables 101 are arranged around one of the strands of shunt 11 and are bound together by a sheath 10.

The signal cables 101, the strands of the shunts 11, the hoses 81 and the single lines 61, 62 all have a circular cross-section. The protective sheath 7 has the shape of a hollow circular cylinder. On its inner side lies the extended earth conductor 93, which also has the shape of a round hollow cylinder. Inside this hollow cylinder formed by the extended earth conductor 93 are the two single lines 61, 62 and all the other components of the charging cable. The inner radius of the braid of the extended earth conductor 93 is equal to the diameter of a single line 61, and the diameter of the two single lines 61, 62 is equal. The braid of the extended ground conductor 93 is configured to allow a small increase in its inner radius. The sheath 10 and one of the hoses 81 have a diameter of approximately ⅔ of the diameter of the first single line 61. The two remaining hoses 81 and the two strands of the shunt 11, which are located outside the sheath 10, preferably have a diameter of approximately ⅓ of the diameter of the first single line 61.

In a preferred embodiment, a single line 6 includes a helix 011 having a diameter of 7.4 mm, which helix 011 is made of a chromium-nickel-steel wire having a diameter of 0.6 mm, as an open support structure. This helix 011 is surrounded by several layers of copper wire, with the layer of copper wires nearest the support structure constituting the channel conductors. The number of wires and the diameter of the wires are selected in such a way that the conductor cross-section 23 of the single line 6 is 35 mm². These channel conductors 21 and the further conductors 22 are surrounded by an insulation, preferably composed of EPDM or TPE, having a thickness of 2 mm, so that the single line 6 has a diameter of 12 mm.

In a preferred embodiment of a charging cable 12, the charging cable 12 comprises two of these single lines 61, 62, two hoses 81 made of polyurethane (PUR) having an outer diameter of 4.0 mm and a hose 81 having an outer diameter of 8.0 mm; the wall thickness of the large hose 81 is 1 mm and the wall thickness of the small hoses 81 is 0.5 mm. The hose 81 having an outer diameter of 8.0 mm receives the cooling fluid 5 which has flowed through the channels 4 of both single lines 61, 62 and cools them. The hoses 81 having an outer diameter of 4.0 mm serve as a supply and return line for a plug cooling 146. Furthermore, the charging cable 12 comprises six signal cables 101 each having a conductor cross-section 1013 of 0.75 mm² and a conductor diameter of 1 mm. This is surrounded by an insulation 3 having a wall thickness of 0.5 mm. These six signal cables 101 are arranged around a shunt 11, preferably made of PP or PE, having a diameter of 2 mm. A sheath 10 having a thickness of 0.5 mm is arranged around the six signal cables 101. The whole arrangement is surrounded by a braid of copper wires having a diameter of 0.25 mm, and the braid forms a cylinder having an inner diameter of 24 mm. A protective sheath 7 having a wall thickness of 2.75 mm surrounds everything, so that the charging cable 12 has a total diameter of 30 mm. This charging cable 12 is easy to grip. It contains a volume of 90.5 mm³ of copper per mm of length, and a volume of 67.5 mm³ of water per mm of length when the charging cable 12 is operated with water as the cooling fluid 5. This gives a weight of slightly less than 1 g/mm length of charging cable or 1 kg/m length of cable. With cooling using water at 20° C. and a flow rate of 1.8 l/min, this charging cable 12 can transmit a current of 700 A over a length of 7 meters without the surface becoming hotter than 50° C. at an ambient temperature of 20° C. Under the same conditions, almost 600 A can be transmitted without the charging cable 12 becoming hotter than 40° C. anywhere on its surface.

FIG. 5 shows a charging system comprising a charging cable 12, a plug 14 and an end connector 13. The end connector 13 comprises electrical contacts 131 and a fluid supply 132 for the cooling fluid 5. The end connector 13 comprises two connector parts, but these are not visible in FIG. 5. The fluid feed 132 is configured to provide a pump or piping system that provides the cooling fluid 5 with a desired pressure differential between the inflow and outflow of the fluid feed 132. The fluid supply 132 comprises fluid connections of the two connection parts that the end connector 13 comprises. The electrical contacts 131 are configured to be connected to a power source providing the power to be transmitted. The electrical contacts 131 are the tapping points of the connection parts that the end connector 13 comprises.

The plug 14 includes two connector parts 147a, b, the common boundary of which is indicated by a dashed line in FIG. 5.

The plug 14 comprises in its interior a fluid return 141 which receives cooling fluid 5 from one of the single lines 61, 62 and conducts it into the other single line or which receives cooling fluid 5 from both single lines 61, 62 and conducts it into one or two hoses 81 of the charging cable. The fluid return 141 is realized by the design of the fluid connections of the two connector parts that the plug comprises. Furthermore, the plug 14 comprises electrical contacts 142 via which an electrical connection to the energy storage device to be charged can be established. The electrical contacts 142 are the tapping points of the two connection parts that the plug 14 comprises. The plug 14 may further comprise other contacts which are connected to signal cables 101 and via which a data exchange can take place between the apparatuses connected to the charging cable 12.

FIG. 6 shows a section through a plug 14 with a plug cooling 146. The plug 14 comprises three connections for hoses 81 of the cable 145, 144 and two connections for single lines 143. The two connections for single lines 143 are formed as tubes of good conducting material. The channel conductors 21 and the possibly further conductors 22 are brought into contact with the tube, for example by placing them over the outside of the tube and clamping and/or soldering them there. Due to this clamping and/or soldering, the cooling fluid 5 is prevented from reaching the outside of the tube. The tube preferably has an internal diameter which is approximately the same size or slightly larger than the channel or channels 4 of the single line 6 to be connected. The interior of the tube is preferably made of an electrically insulating material. The fluid enters the interior of the tube. Shortly after the connection, in the interior of the plug 14, the tube splits: the good conducting material of the tube wall is combined and merges into the desired shape of the electrical contact 142 at the plug outlet, the tapping point. The insulating material inside the tube forms a tube which merges with the tube of the connector for the second single line 143, eventually leading to the connector for a hose 144. This is the fluid return 141 of the plug 14. The connection for a hose 144 may comprise a tube which widens conically towards the connector. The hose 81 may be pulled over this tube and then clamped in place. In the same way, the other two connections for hoses 145 may be designed. These represent the outflow and return flow for the plug cooling 146. This comprises one or more cooling lines which pass those parts of the plug 14 which are to be specifically cooled.

For the sake of clarity, the two connecting parts 147a,b have not been specifically marked in FIG. 6. The contacts 142 represent the tapping points of the connection parts 147a,b. The fluid connection of one connector part leads into the fluid connection of the other connector part. The fluid port of the other connector part includes the fluid return 141 and the port for a hose 144.

FIG. 7 shows a vehicle 15 with two single lines 16 that provide a connection between an outlet 152 and a drive energy storage device 151.

In summary, the conductor cross-sections of the single lines 6, the ground conductor 9 and the signal cables 101 can be selected according to the respective requirements. Likewise, the arrangement of the components of the charging cable can be selected to suit the requirements. For example, sensors may be integrated into the charging cable 12 and the number of signal cables 101 may be selected to be higher or lower. In particular, strands of shunt 11 may be replaced by signal cables 101, sensors, further hoses 81, further conductors for transmitting electrical power and/or unstructured filling material. The protective sheath 7 may be reinforced, for example with electrically insulated rings or a wire helix to further improve rollover resistance. Further reinforcement may also be provided around the protective sheath 7. Instead of tinned copper, bare copper, copper alloys, aluminium or other conductor materials may be used, throughout or only in parts of the single lines 6 and/or the charging cable. Similarly, the tubing 81 may be made of EPDM, nylon, polyamide or silicone. The hoses may be fibre reinforced. The wall thicknesses of insulations and hoses 81 can be selected according to the respective requirements. The material of the protective sheath 7 and the material of the insulation 3 of the single lines 61, 62 may be identical. The sheath 10 of the signal cables 101 may be dispensed with. The channel conductors 21 may be configured as single wires, bundles or strands of wires. Wires and groups of wires may be replaced by tapes or strands of multiple wires. The protective sheath 7 need not be round, but may also conform to the shape of the cable components or to external conditions.

The invention claimed is:

1. A single line for a charging cable, comprising:
   a) an open support structure in the form of a helix and having a longitudinal extent,
   b) at least one channel conductor made of an electrically conductive material, and
   c) an insulation,
   wherein:
   d) the at least one channel conductor is the form of a helix that wraps around and contacts the open support structure along its longitudinal extent,
   e) the insulation encases the open support structure and the at least one channel conductor,
   f) at least one channel for a cooling fluid is formed by the support structure and the at least one channel conductor,
   g) the insulation is impermeable to the cooling fluid and is electrically insulating, and
   wherein:
   h) the support structure has a first thread direction, the at least one channel conductor has a second thread direction, and the second thread direction differs from the first thread direction, or
   i) the pitch ratio, which is the smallest pitch of the helix of the at least one channel conductor divided by the pitch of the helix of the open support structure, is greater than 4/3 and less than 50.

2. The single line according to claim 1, wherein:
   the at least one channel conductor is a plurality of channel conductors,
   each of said channel conductors follows a helical line having the second thread direction, the pitch and a radius, and the thread direction and the pitch of the helical lines of all of said channel conductors are at least substantially equal, and
   the radii of all helical lines of all of the channel conductors are equal.

3. The single line according to claim 1, wherein:
   the at least one channel conductor is a plurality of channel conductors, and
   each of the channel conductors is a stranded wire or a bundle of individual thin conductor wires.

4. The single line according to claim 1, wherein the open support structure has a cross-section that remains constant in shape and size along the longitudinal extent, but has a shape that twists about a longitudinal axis along the longitudinal extent.

5. The single line according to claim 1, wherein the insulation is a fibre reinforced insulation.

6. The single line according to claim 5, wherein the fibres are woven into a braid.

7. The single line according to claim 5, wherein the fibres in the insulation are arranged substantially in a layer and in said layer cover between 30 and 90% of the area of the layer.

8. A charging cable comprising:
   a first and a second single line according to claim 1, and
   a common protective sheath.

9. The charging cable according to claim 8, further comprising:
   a grounded conductor braid surrounding the first and second single lines and enveloped by or integrated into the common protective sheath, and/or
   a grounded conductor in the form of juxtaposed wires or strands or bundles which are integrated into the common protective sheath and which wrap both of the first and second single lines together, wherein strands or bundles are separated from one another by sections of protective sheath material which does not contain any grounded conductor.

10. The charging cable according to claim 8, further comprising:
    at least one hose made of a fluid-tight material, which is located inside the common protective sheath but outside the first and second single lines.

11. A connection system comprising the single line according to claim 1 and two connection parts, each of the two connection parts respectively comprising a fluid connection and an electrical connection,
    wherein each of the fluid connections enables fluid to flow into or out of the single line and each of the electrical connections provides a path for conducting electrical power between a tap point and the at least one conductor of the single line,
    wherein each of the connection parts is formed as a chamber which has an opening for the fluid-tight connection of the single line and a second opening for the connection of a fluid line, and
    wherein an electrical contact for establishing an electrical connection with the at least one conductor of the single line is located within this chamber, and this contact is connected to a current line which leads to the tapping point.

12. A charging system comprising a first and a second connection system according to claim 11, wherein the first connection system comprises the first single line of a charging cable and the second connection system comprises a second single line of the charging cable, the charging cable comprising a common protective sheath,
    wherein:
    a first end of the first single line and a first end of the second single line are located at the first end of the charging cable,
    a second end of the first single line and a second end of the second single line are located at the second end of the charging cable,
    an end connector comprises the connection part at the first end of the first single line and the connection part at the first end of the second single line, and
    a plug comprises the connection part at the second end of the first single line and the connection part at the second end of the second single line.

13. A method of charging an energy storage device, at a stationary charging station configured to provide cooling fluid and electrical power and to which a first end of the charging cable according to claim 8 is connected, comprising:
    a) connecting a second end of the charging cable to the energy storage device,
    b) introducing the cooling fluid under pressure into the channels of the first and second single lines of the charging cable, and
    c) conducting electrical energy via the channel conductors of the first and second single lines of the charging cable, wherein signal cables of the charging cable transmit signals for controlling and/or monitoring the charging process and/or the state of charge of the energy storage device.

14. A single line for a charging cable, comprising:
    an open support structure having a longitudinal extent,
    at least one channel conductor made of an electrically conductive material, the at least one channel conductor being wrapped around and contacting the open support structure along its longitudinal extent, an insulation encasing the open support structure and the at least one channel conductor, the insulation being reinforced by fibres, and at least one channel for a cooling fluid defined by the support structure and the channel conductors, wherein:

the insulation is impermeable to the cooling fluid and is electrically insulating, and the fibres in the insulation are arranged substantially in a layer and in said layer cover between 30 and 90% of the area of the layer.

15. A method of manufacturing the charging cable according to claim 8 comprising the following steps, which are carried out sequentially in a production line:

a) providing the first and second single lines and additional components of an inner structure of the charging cable as endless products;

b) twisting the components of the inner structure together in a first direction;

c) wrapping the twisted components of the inner structure with wires, bundles or strands in a second direction different from the first direction, and d) co-extruding a protective sheath.

16. A vehicle comprising at least two single lines according to claim 1, wherein the at least two single lines electrically connect a drive energy storage unit and a drive unit and/or electrically connect a socket in the exterior of a vehicle and a drive energy storage unit.

17. A charging station comprising at least two single lines according to claim 1 configured to connect a plug of a charging system to a stationary power source.

18. The single line according to claim 1, wherein:

the support structure has the first thread direction, the at least one channel conductor has the second thread direction, and the second thread direction differs from the first thread direction, and the pitch ratio is a quasi-irrational number in the range of 6 to 50.

19. A method of manufacturing the single line according to claim 14, comprising the following steps which are carried out successively in a production line:

a) providing the open support structure and multiple channel conductors as a continuous material;

b) winding the channel conductors onto the open support structure;

c) winding further conductors around the structure created in step b);

d) co-extruding the insulation around the result of step or;

e) weaving a braid of fibres or winding fibres around the insulation produced in step d), and f) co-extruding a second layer of material of the insulation around the product of step e) to form a fibre reinforced insulation.

20. The single line according to claim 14, wherein the fibres in said layer cover between 50 and 70% of the area of the layer.

* * * * *